(12) United States Patent
Müller et al.

(10) Patent No.: US 9,957,353 B2
(45) Date of Patent: May 1, 2018

(54) LOW VISCOSITY POLYETHER CARBONATE POLYOLS HAVING SIDE CHAINS

(71) Applicant: Covestro Deutschland AG, Leverkusen (DE)

(72) Inventors: Thomas E. Müller, Aachen (DE); Christoph Gürtler, Köln (DE); Muhammad A. Subhani, Aachen (DE); Walter Leitner, Aachen (DE)

(73) Assignee: COVESTRO DEUTSCHLAND AG, Leverkusen (DE)

( * ) Notice: Subject to any disclaimer, the term of this patent is extended or adjusted under 35 U.S.C. 154(b) by 0 days. days.

(21) Appl. No.: 14/915,668

(22) PCT Filed: Sep. 1, 2014

(86) PCT No.: PCT/EP2014/068500
§ 371 (c)(1),
(2) Date: Mar. 1, 2016

(87) PCT Pub. No.: WO2015/032717
PCT Pub. Date: Mar. 12, 2015

(65) Prior Publication Data
US 2016/0185903 A1     Jun. 30, 2016

(30) Foreign Application Priority Data
Sep. 5, 2013 (EP) .................................... 13183206

(51) Int. Cl.
C08G 65/26 (2006.01)
C08G 64/18 (2006.01)
C08G 18/48 (2006.01)
C08G 18/72 (2006.01)

(52) U.S. Cl.
CPC ......... *C08G 65/2603* (2013.01); *C08G 18/48* (2013.01); *C08G 18/72* (2013.01); *C08G 64/183* (2013.01); *C08G 65/2663* (2013.01); *C08G 65/2696* (2013.01)

(58) Field of Classification Search
CPC ............ C08G 65/2603; C08G 65/2663; C08G 65/2696
See application file for complete search history.

(56) References Cited

U.S. PATENT DOCUMENTS

| | | | |
|---|---|---|---|
| 3,404,109 A | 10/1968 | Milgrom | |
| 3,829,505 A | 8/1974 | Herold | |
| 3,941,849 A | 3/1976 | Herold | |
| 4,745,170 A * | 5/1988 | Bushman | C08G 18/4845 528/61 |
| 5,158,922 A | 10/1992 | Hinney et al. | |
| 5,470,813 A | 11/1995 | Le-Khac | |
| 6,767,986 B2 | 7/2004 | Moethrath et al. | |
| 6,780,813 B1 | 8/2004 | Hofmann et al. | |
| 6,835,687 B2 | 12/2004 | Hofmann et al. | |
| 7,008,900 B1 | 3/2006 | Hofmann et al. | |
| 2003/0092879 A1* | 5/2003 | Sunder | C08G 18/48 528/403 |
| 2009/0286940 A1* | 11/2009 | Frings | C08G 65/3312 525/460 |
| 2010/0048935 A1* | 2/2010 | Mijolovic | C08G 64/0208 558/276 |
| 2011/0251355 A1 | 10/2011 | Jeong et al. | |
| 2013/0296450 A1 | 11/2013 | Hofmann et al. | |
| 2015/0259475 A1 | 9/2015 | Müller et al. | |

FOREIGN PATENT DOCUMENTS

| | | |
|---|---|---|
| EP | 0700949 A2 | 3/1996 |
| EP | 0743093 A1 | 11/1996 |
| EP | 0761708 A2 | 3/1997 |
| EP | 1359177 A1 | 11/2003 |
| EP | 2465890 A1 | 6/2012 |
| EP | 2888309 A1 | 7/2015 |
| JP | S50154348 A | 12/1975 |
| JP | 4145123 A | 5/1992 |
| WO | WO-97/40086 A1 | 10/1997 |
| WO | WO-98/16310 A1 | 4/1998 |
| WO | WO-00/47649 A1 | 8/2000 |
| WO | WO-01/39883 A1 | 6/2001 |
| WO | WO-01/80994 A1 | 11/2001 |
| WO | WO-2006/103213 A1 | 10/2006 |
| WO | WO-2010028362 A1 | 3/2010 |
| WO | WO-2014033071 A1 | 3/2014 |

OTHER PUBLICATIONS

International Search Report for PCT/EP2014/068500 dated Feb. 6, 2015.
Jansen et al., "Synthesis of novel side-chain liquid crystalline polycarbonates", Macromol. Chem. Phys., Bd. 200, 1999, pp. 1407-1420.
XP002723523, Chemical Abstracts Service, Columbus, OH, "Thermosetting polycarbonate compositions", Database accession No. 176:136631.

* cited by examiner

*Primary Examiner* — Michael L Leonard
(74) *Attorney, Agent, or Firm* — K&L Gates LLP

(57) ABSTRACT

The present invention provides a method for producing low viscosity polyether carbonate polyols having side chains. A double metal cyanide catalyst and a suspension medium, with or without an H-functional starter compound, are initially introduced as a reaction mixture, and alkylene oxides are metered into the reaction mixture in two steps. The difference between the molecular weights of the lightest and the heaviest of the alkylene oxides metered in the two steps is greater than or equal to 24 g/mol, and the lightest alkylene oxide is a C2-C4 alkylene oxide. The alkylene oxides metered in the two steps can be the same or different. The invention also relates to the low viscosity polyether carbonate polyols produced by the method and to the use thereof.

12 Claims, No Drawings

LOW VISCOSITY POLYETHER CARBONATE POLYOLS HAVING SIDE CHAINS

CROSS-REFERENCE TO RELATED APPLICATIONS

This application is a national stage application (under 35 U.S.C. § 371) of PCT/EP2014/068500, filed Sep. 1, 2014, which claims benefit of European Application No. 13183206.5, filed Sep. 5, 2013, both of which are incorporated herein by reference in their entirety.

The present invention relates to a process for preparing polyethercarbonate polyoyols having side chains, comprising the steps of (α) initially introducing a suspension medium which contains no H-functional groups, or a H-functional starter compound, and a catalyst and (□) metering in carbon dioxide and at least two alkylene oxides, characterized in that the difference in the molecular weight of the lightest and heaviest alkylene oxides metered in stage (γ) is greater than or equal to 24 g/mol and the lightest alkylene oxide is a C2-C4 alkylene oxide. The invention further relates to polyethercarbonate polyols which are preparable by the process of the invention, and to their use.

BACKGROUND OF THE INVENTION

As well as having a tailored functionality, modern plastics are also intended to do increased justice to environmental concerns. As well as by a general optimization of preparation processes, this can be achieved through the use of greenhouse gases, such as carbon dioxide, as building blocks for synthesis. Accordingly, for example, a better environmental balance for the process can be obtained overall via the fixing of carbon dioxide. This path is being followed in the area of the production of polyethercarbonates, and has been a topic of the intense research for more than 40 years (e.g., Inoue et al, Copolymerization of Carbon Dioxide and Alkylenoxide with Organometallic Compounds; Die Makromolekulare Chemie 130, 210-220, 1969). In one possible preparation variant, polyethercarbonate polyols are obtained via a catalytic reaction of alkylene oxides and carbon dioxide in the presence of H-functional starter compounds ("starters"). A general reaction equation for this is given in scheme (I):

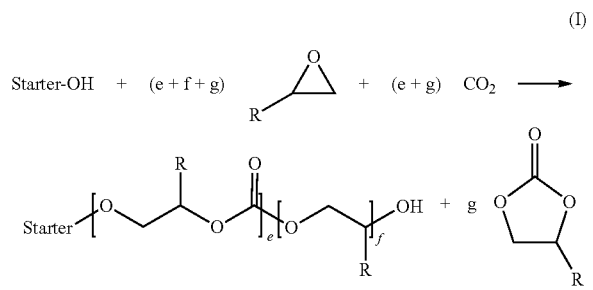

A further product, in this case unwanted byproduct, arising alongside the polyethercarbonate polyol is a cyclic carbonate (for example, R=$CH_3$ propylene carbonate).

Various refinements of this process are known in the literature. Thus, for example, US 20100048935 A1 describes a process for preparing polyethercarbonate polyols in which alkylene oxides and carbon dioxides are added onto H-functional starter compounds using a DMC catalyst. Within the process, one or more starter compounds are introduced initially in a reactor, and then one or more starter compounds are metered in continuously to the ongoing reaction in the reactor.

WO 2006103213 A1, in contrast, describes a process for preparing polyethercarbonate polyols that features improved incorporation of $CO_2$ into the polyethercarbonate polyol, using a catalyst containing a multimetal cyanide. The process discloses the presence of a H-functional starter, an alkylene oxide, and carbon dioxide in the presence of the multimetal cyanide component in a reactor. The process further discloses the presence of a $CO_2$-philic substance or of $CO_2$-philic substituents. The $CO_2$-philic substance or the $CO_2$-philic substituent is intended to increase the incorporation of $CO_2$ into the polyethercarbonate polyol and so to reduce the formation of cyclic alkylene carbonates, such as propylene carbonate, for example, which represent unwanted byproducts.

WO 2010/028362 A1 discloses firstly polymerization systems for the copolymerization of $CO_2$ and epoxides, comprising: 1) a catalyst with a metal-coordination compound having a permanent ligand set and at least one ligand which is a polymerization initiator, and 2) a chain transfer agent having two or more sites which are able to initiate polymerization. This patent application further discloses processes for the synthesis of polycarbonate polyols with the polymerization systems described therein. Disclosed lastly are polyethercarbonate polyol compositions which have a high percentage of OH end groups and a high percentage of carbonate groups. A further feature of the compositions is that they include polymer chains which a polyfunctional unit that is linked to a plurality of individual polycarbonate chains.

The publication "Synthesis of side-chain liquid crystalline polycarbonates with mesogenic groups having tails of different lengths" by John C. Jansen et al., Macromol. Chem. Phys. 200, 1407-1420 (1999) describes, in a model system, the terpolymerization of glycidyl phenyl ether, propylene oxide, and $CO_2$. Catalysts used in this publication are organozinc catalysts.

EP 2 465 890 A1 relates to a process for preparing polyethercarbonate polyols having primary hydroxyl end groups, comprising the steps of reacting a starter compound containing active hydrogen atoms with an epoxide and with carbon dioxide under double metal cyanide catalysis, reacting the resulting product with a cyclic carboxylic anhydride, and reacting this resulting product with ethylene oxide in the presence of a catalyst which comprises at least one nitrogen atom per molecule, with the exception of noncyclic tertiary amines having identical substitution. The patent application further relates to polyethercarbonate polyols obtainable by this process, to compositions comprising these polyethercarbonate polyols, and to polyurethane polymers based on these polyethercarbonate polyols. Japanese patent application JP 50-154348 A relates to a thermosetting polycarbonate composition which is prepared from a polycarbonate having an aliphatic polycarbonate containing double bonds, from a crosslinking catalyst, and, optionally, from a radically polymerizable unsaturated compound. A copolymer of allyl glycidyl ether, carbon dioxide, and propylene oxide and also dicumyl peroxide are mixed in dioxane and dried under reduced pressure.

US 2011/0251355 A1 discloses the preparation of poly (alkylene carbonate) by alternating copolymerization of carbon dioxide and epoxides. Described specifically is the preparation of block copolymers or graft copolymers by alternating copolymerization of an epoxide and carbon dioxide with a metal(III)-salen complex, with a quaternary ammonium salt as catalyst.

Disadvantages of these process regimes presented, however, are that the reaction of the monomers is slow and the reaction products include polyethercarbonates which have a relatively high viscosity, causing them to have relatively poor further-processing properties. Thus, for example, the high viscosity limits the possibility for further reaction of these prior-art polyethercarbonates in further crosslinking reactions.

BRIEF SUMMARY OF THE INVENTION

It is an object of the present invention, therefore, to remove the disadvantages of the polyethercarbonates stated in the prior art and in particular to provide a process for preparing low-viscosity polyethercarbonate polyols wherein the monomers react at a sufficient rate and the resulting polyethercarbonate polyol has a particularly low viscosity. The present invention further discloses low-viscosity polyethercarbonate polyols having side chains, preparable by this process, and the use thereof.

The object is achieved in accordance with the invention by a process for preparing polyethercarbonate polyols, comprising the steps of:
($\alpha$) initially introducing a catalyst and
  ($\alpha\alpha$) a suspension medium which contains no H-functional groups
  and/or
  ($\alpha\beta$) a H-functional starter compound
($\beta$) metering in at least one epoxide, the difference in the molecular weight of the lightest and heaviest alkylene oxides metered in stages ($\beta$) and ($\gamma$) being greater than or equal to 24 g/mol and the lightest alkylene oxide being a C2-C4 alkylene oxide, it being possible for the epoxide(s) metered in step ($\gamma$) to be identical to or different from the epoxide or epoxides metered in step ($\beta$), and the step ($\beta$) being carried out between step ($\alpha$) and step ($\gamma$)
($\gamma$) metering in carbon dioxide and at least two alkylene oxides, it being possible for these alkylene oxides to be the same as or different from the alkylene oxide or oxides metered in step ($\beta$),
and the difference in the molecular weight of the lightest and heaviest alkylene oxides metered in stage ($\gamma$) being greater than or equal to 24 g/mol and the lightest alkylene oxide being a C2-C4 alkylene oxide, and, where no H-functional starter compound has been initially introduced in step ($\alpha$), step ($\gamma$) comprising the metered addition of a H-functional starter compound, and the catalyst being a double metal cyanide catalyst.

DETAILED DESCRIPTION OF THE INVENTION

Embodiments of the present invention are outlined below. They can be combined with one another as desired, unless the opposite is clear from the context.

Surprisingly it has been found that through the choice of at least two alkylene oxides with a defined difference in molecular weight, i.e. with bulky radicals $R_X$ that exhibit defined differences, the reaction described above results in polyethercarbonate polyols which exhibit not only a low fraction of unreacted monomers but also an unusually low viscosity. The lightest metered alkylene oxide in the sense of the invention is the alkylene oxide with the lowest molecular weight, whereas the heaviest added alkylene oxide is the alkylene oxide with the greatest molecular weight. The molecular weight difference of the two alkylene oxides comes about by simple subtraction of the molecular weights (molecular weight of the alkylene oxide having the greatest molecular weight–molecular weight of the alkylene oxide having the lowest molecular weight). Without being tied by the theory, the reaction is presumed to proceed as per reaction scheme II:

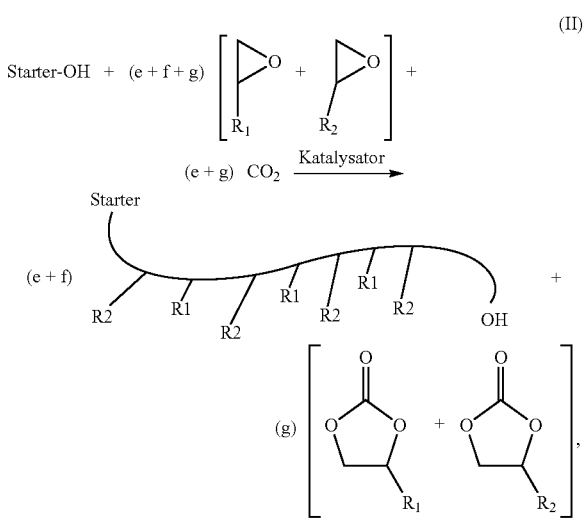

with the heavier alkylene oxides, through the reduction in the intermolecular polymer-polymer interactions, disrupting the arrangement of the polyethercarbonate polyols in solution/melt in such a way as to produce a lower viscosity of the polyethercarbonate polyols. The terpolymerization with alkylene oxides having defined weight differences exhibits this effect, in particular, and is much more advantageous than a "simple" polymerization of only one monomer species.

The upper limit on the molecular weight difference between lightest and heaviest alkylene oxides used may be 950 g/mol, preferably 850 g/mol, and more preferably 400 g/mol. The choice of the molecular weight difference of the invention between the alkylene oxides as well, specifically, allows a significant reduction of the viscosity for only a very moderate increase in the molecular weight of the overall polymer. This difference is preferably ≥24 g/mol to ≤950 g/mol, more preferably ≥30 g/mol to 850 g/mol, and very preferably ≥36 g/mol to 400 g/mol.

In connection with the present invention, the term "low-viscosity polyethercarbonate polyols" refers in particular to those polyethercarbonate polyols which have a viscosity at 25° C. of less than 20 000 mPa·s. The method for determining the viscosity is specified later on below in the experimental section.

These properties are particularly desirable not only in the handling of the product as such but also in the context of any possible further processing, as for example by reaction as part of a further crosslinking reaction. Greater differences in the molecular weight of the heaviest alkylene oxide relative to the lightest may result in an excessive, i.e., undesirable, increase in the molecular weight of the resulting polyether carbonate polyols, without achieving an appropriate reduction in viscosity. Apparently, above a certain difference in molecular weight, the "increase" in disruption to the intermolecular interactions is no longer able to compensate the increased viscosity arising from the increase in molecular weight. In comparison, symmetrically constructed molecules having three chains of equal length, arising from a central unit of low molecular weight, such as glycerol, for example, exhibit particularly unadvantageous viscosities. Accordingly, EP 12181907.2-1301, for a polyethercarbonate obtained using glycerol as trifunctional starter, describes a significantly increased viscosity (36.0 Pa·s) in comparison with a polyethercarbonate obtained using dipropylene glycol as difunctional starter (4.1 Pa·s). Smaller differences of molecular weight, in contrast, lead only to an insufficient disruption to the intermolecular interactions, making it impossible to achieve an appropriate decrease in viscosity.

The combination of the molecular weight difference of the invention for the alkylene oxides used with a two-stage to three-stage process, in particular, results in certain process advantages. As a result of the at least two-stage addition of the alkylene oxides, the catalyst can be preconditioned (activated) in a first step, which is able subsequently to lead to a more rapid and more selective reaction to give low-viscosity polyethercarbonate polyols. Without being tied by the theory, the subsequent polymerization reaction may also take place more selectively with a preconditioned catalyst.

The explicit technical embodiment of the process of the invention may be very diverse and can be tailored to the specific properties of the desired polymer. It is possible accordingly to vary, for example, the sequence of the addition of the suspension medium containing no H-functional groups to the H-functional starter compound or to the mixture of at least two H-functional starter compounds, and of the catalyst in step ($\alpha$), and the addition of the monomers and of the carbon dioxide in steps ($\beta$) and ($\gamma$). The amount and the timing of the addition of the individual monomer components, in particular, may influence the properties of the resulting polyethercarbonate polyols. Accordingly, the alkylene oxides may be metered together within a mixture or in each case separately,
as a single addition or divided over a plurality of metering steps,
at a constant proportion over the entire operating time, or in concentrations which vary over time.

The quantity, timing, and form of the addition of the carbon dioxide to the mixture may also be varied.

In one preferred embodiment of the process which can be used in accordance with the invention for preparing the polyethercarbonate polyols from one or more H-functional starter compounds, two or more alkylene oxides, and carbon dioxide, in the presence of a DMC catalyst, ($\alpha$) [first activation stage] a suspension medium containing no H-functional groups, a H-functional starter compound, a mixture of a suspension medium containing no H-functional groups and a H-functional starter compound, or a mixture of at least two H-functional starter compounds is introduced initially, and optionally water and/or other volatile compounds are removed by increased temperature and/or reduced pressure, the DMC catalyst being added to the suspension medium, to the H-functional starter compound, or to the mixture of at least two H-functional starter compounds, before or after the 1st activation stage, ($\beta$) [second activation stage] a portion (based on the total amount of the amount of alkylene oxides used in steps ($\beta$) and ($\gamma$)) of one or more alkylene oxides is added to the mixture resulting from step ($\alpha$), it being possible for the addition of a portion of alkylene oxides to take place optionally in the presence of $CO_2$ and/or inert gas (such as nitrogen or argon, for example), and it also being possible for step ($\beta$) to take place two or more times, ($\gamma$) [polymerization stage] for the construction of a polyethercarbonate polyol polymer chain, a mixture of two or more alkylene oxides with a difference in molecular weight between the lightest and heaviest of greater than or equal to 24 g/mol and less than or equal to 500 g/mol, the lightest alkylene oxide being selected from the group encompassing C2-C4 alkylene oxides, and carbon dioxide, are metered continuously into the mixture resulting from step ($\beta$), it being possible for the alkylene oxides used for the terpolymerization to be the same as or different from the alkylene oxides used in step ($\beta$).

Step ($\alpha$):

The individual components in step ($\alpha$) can be added simultaneously or in succession in any order; preferably, in step ($\alpha$), the DMC catalyst is introduced initially, and, subsequently or at the same time, suspension medium containing no H-functional groups, the H-functional starter compound, the mixture of a suspension medium containing no H-functional groups and the H-functional starter compound, or the mixture of at least two H-functional starter compounds is added. Two or more catalysts from the group of the DMC catalysts may also be used.

A preferred embodiment provides a process wherein, in step ($\alpha$), ($\alpha$1) a reactor is charged with the DMC catalyst and suspension medium containing no H-functional groups, and/or with one or more H-functional starter compounds, ($\alpha$2) an inert gas (for example nitrogen or a noble gas such as argon), an inert gas-carbon dioxide mixture or carbon dioxide is passed through the reactor at a temperature of 50 to 200° C., preferably of 80 to 160° C., more preferably of 125 to 135° C., and, at the same time, a reduced pressure (in absolute terms) of 10 mbar to 800 mbar, preferably of 40 mbar to 200 mbar, is established in the reactor by removing the inert gas or carbon dioxide (for example with a pump) [first activation stage].

A further preferred embodiment provides a process wherein, in step ($\alpha$), ($\alpha$1) suspension medium containing no H-functional groups, the H-functional starter compound and/or a mixture of at least two H-functional starter compounds is introduced initially, optionally under an inert gas atmosphere (for example, nitrogen or argon), under a mixed inert gas/carbon dioxide atmosphere, or under a pure carbon dioxide atmosphere, more preferably under an inert gas atmosphere, and ($\alpha$2) an inert gas (for example, nitrogen or a noble gas such as argon), an inert gas/carbon dioxide mixture, or carbon dioxide, more preferably an inert gas (nitrogen or argon, for example), is introduced into the resulting mixture of DMC catalyst and suspension medium containing no H-functional groups, and/or one or more H-functional starter compounds, at a temperature of 50 to 200° C., preferably of 80 to 160° C., more preferably of 125 to 135° C., and a reduced pressure (absolute) of 10 mbar to 800 mbar, preferably of 40 mbar to 200 mbar, is established in the reactor at the same time by removal of the inert gas or carbon dioxide (using a pump, for example) [first activation stage], the double metal cyanide catalyst being added to the suspension medium containing no H-functional groups, the H-functional starter compound, the mixture of a suspension medium containing no H-functional groups and the H-functional starter compound, or the mixture of at least two H-functional starter compounds in step (α1) or immediately thereafter in step (α2).

The DMC catalyst can be added in solid form or in a suspension medium which comprises no H-functional groups, or in suspension in one or more H-functional starter compounds. If the DMC catalyst is added as a suspension, it is added preferably in step (α1) to the suspension medium and/or to the one or more H-functional starter compounds.

Step (β):

Step (β) of the second activation stage may take place in the presence of $CO_2$ and/or inert gas (such as nitrogen or argon, for example). Step (β) preferably takes place under an atmosphere composed of an inert gas/carbon dioxide mixture (nitrogen/carbon dioxide or argon/carbon dioxide, for example) or a carbon dioxide atmosphere, more preferably under a carbon dioxide atmosphere. The establishment of an inert gas/carbon dioxide atmosphere or a carbon dioxide atmosphere and the metering of one or more alkylene oxides may take place in principle in different ways. The supply pressure is preferably established by introduction of carbon dioxide, where the pressure (in absolute terms) is 10 mbar to 100 bar, preferably 100 mbar to 50 bar and especially preferably 500 mbar to 50 bar. The start of the metering of the alkylene oxide or oxides may take place at a supply pressure selected arbitrarily beforehand. The overall pressure (absolute) of the atmosphere is adjusted in step (β) preferably in the range from 10 mbar to 100 bar, preferably 100 mbar to 50 bar, and more preferably 500 mbar to 50 bar. Optionally, during or after the metering of the alkylene oxide, the pressure is reregulated by introduction of further carbon dioxide, with the pressure (absolute) being 10 mbar to 100 bar, preferably 100 mbar to 50 bar, and more preferably 500 mbar to 50 bar.

In a further embodiment, the amount of one or more alkylene oxides used in the activation in step (β) may be 0.1 to 25.0 wt %, preferably 1.0 to 20.0 wt %, more preferably 2.0 to 16.0 wt %, based on the amount of suspension medium containing no H-functional groups used in step (α), or of H-functional starter compound. The alkylene oxide can be added in one step or stepwise in two or more portions.

In one additional embodiment of the invention, during the activation in step (β), a portion (relative to the total amount of the amount of alkylene oxides used in steps (β) and (γ)) of one or more alkylene oxides is added to the mixture resulting from step (α) [second activation stage]. This addition of a portion of alkylene oxides may take place optionally in the presence of $CO_2$ and/or inert gas. Step (β) may also take place multiply. The DMC catalyst is preferably used in an amount such that the amount of DMC catalyst in the resulting polyethercarbonate polyol is 10 to 10 000 ppm, more preferably 20 to 5000 ppm, and most preferably 50 to 500 ppm.

In the second activation step, the alkylene oxide or oxides may be added, for example, in one portion, over the course of 1 to 15 minutes or, preferably, over the course of 5 to 10 minutes. The duration of the second activation step is preferably 15 to 240 minutes, more preferably 20 to 60 minutes.

Step (γ):

The metering of the molecular weight-differentiated alkylene oxides and of the carbon dioxide may take place simultaneously, alternatively, or sequentially. The required amount of carbon dioxide may be added all at once or metered over the reaction time. It is possible during the addition of the alkylene oxides to raise or to lower the $CO_2$ pressure, gradually or in steps, or to leave it the same. Preferably, the total pressure is kept constant during the reaction by metered addition of further carbon dioxide. The metering of the alkylene oxide or oxides and of the $CO_2$ may take place simultaneously, alternatively or sequentially to the metering of carbon dioxide. The alkylene oxide or oxides can be metered with a constant rate, or the metering rate may be raised or lowered continuously or in steps, or the alkylene oxide or oxides may be added in portions. Preferably, the alkylene oxide is added to the reaction mixture at a constant metering rate. A plurality of alkylene oxides may be metered in individually or as a mixture. The metered addition of the alkylene oxides can be effected simultaneously, alternately or sequentially, each via separate metering points (addition points), or via one or more metering points, in which case the alkylene oxides can be metered in individually or as a mixture. Via the nature and/or sequence of the metering of the alkylene oxides and/or of the carbon dioxide it is possible to synthesize random, alternating, blocklike or gradientlike polyethercarbonate polyols of low viscosity that have side chains.

Preference is given to using an excess of carbon dioxide, relative to the calculated amount of carbon dioxide required in the polyethercarbonate polyol, since an excess of carbon dioxide is an advantage because of the reactive inertia of carbon dioxide. The amount of carbon dioxide can be specified by way of the total pressure. A total pressure (absolute) which has proven advantageous is the range from 0.01 to 120 bar, preferably 0.1 to 110 bar, more preferably from 1 to 100 bar for the copolymerization for preparing the low-viscosity polyethercarbonate polyols having side chains. It is possible to supply the carbon dioxide to the reaction vessel continuously or discontinuously. This depends on how quickly the alkylene oxides and the $CO_2$ are consumed and on whether the product is to include, optionally, $CO_2$-free polyether blocks or blocks with different $CO_2$ contents. The concentration of carbon dioxide may also be varied during the addition of the alkylene oxides, Depending on the reaction conditions selected, it is possible for the $CO_2$ to be introduced into the reactor in the gaseous, liquid or supercritical state. $CO_2$ can also be added to the reactor in solid form and then be converted under the selected reaction conditions to the gaseous, dissolved, liquid and/or supercritical state.

In step (γ), the carbon dioxide can be introduced into the mixture, for example, by
  (i) sparging the reaction mixture in the reactor from below,
  (ii) using a hollow-shaft stirrer,
  (iii) a combination of metering forms as per (i) and (ii), and/or
  (iv) sparging via the surface of the liquid, by using multilevel stirring elements.

The sparging of the reaction mixture in the reactor as per (i) is preferably effected by means of a sparging ring, a sparging nozzle, or by means of a gas inlet tube. The sparging ring is preferably an annular arrangement or two or more annular arrangements of sparging nozzles, preferably arranged at the base of the reactor and/or on the side wall of the reactor.

The hollow-shaft stirrer as per (ii) is preferably a stirrer in which the gas is introduced into the reaction mixture via a hollow shaft in the stirrer. The rotation of the stirrer in the reaction mixture (i.e. in the course of mixing) gives rise to a reduced pressure at the end of the stirrer paddle connected to the hollow shaft, such that the gas phase (containing $CO_2$ and any unconsumed alkylene oxide) is sucked out of the gas space above the reaction mixture and is passed through the hollow shaft of the stirrer into the reaction mixture.

The sparging of the reaction mixture as per (i), (ii), (iii) or (iv) may take place with freshly metered carbon dioxide in each case and/or may be combined with suction of the gas from the gas space above the reaction mixture and subsequent recompression of the gas. For example, the gas suctioned off from the gas space above the reaction mixture and compressed, optionally mixed with fresh carbon dioxide and/or alkylene oxide, is introduced again into the reaction mixture as per (i), (ii), (iii) and/or (iv).

The pressure drop which comes about via incorporation of the carbon dioxide and of the alkylene oxides into the reaction product during the terpolymerization is preferably compensated by freshly metered in carbon dioxide.

The alkylene oxides can be introduced separately or together with the $CO_2$, either above the liquid surface or directly into the liquid phase. The alkylene oxides are preferably introduced directly into the liquid phase, since this has the advantage of rapid mixing of the introduced alkylene oxide with the liquid phase, thereby preventing local peaks in concentration of alkylene oxides. The introduction into the liquid phase can be effected via one or more inlet tubes, one or more nozzles or one or more annular arrangements of multiple metering points, which are preferably arranged at the base of the reactor and/or at the side wall of the reactor.

The three steps ($\alpha$), ($\beta$) and ($\gamma$) can be performed in the same reactor, or each can be performed separately in different reactors. Particularly preferred reactor types are stirred tanks, tubular reactors, and loop reactors. Where reaction steps ($\alpha$), ($\beta$), and ($\gamma$) are carried out in different reactors, a different type of reactor can be used for each step.

Polyethercarbonate polyols with side chains can be prepared in a backmixed reactor, such as a stirred tank or a loop reactor; depending on embodiment and mode of operation, the stirred tank or loop reactor is cooled via the reactor shell, via internal cooling surfaces and/or via cooling surfaces within a pumped circulation system. Both in semibatchwise application, in which the product is not removed until after the end of the reaction, and in continuous application, in which product is removed continuously, particular attention should be paid to the metering rate of the alkylene oxides. This should be set such that, in spite of the inhibiting action of the carbon dioxide, the alkylene oxides are depleted quickly enough. The concentration of free alkylene oxides in the reaction mixture during the second activation stage (step $\beta$) is preferably >0 to <100 wt %, more preferably >0 to ≤50 wt %, very preferably >0 to ≤20 wt % (based in each case on the weight of the reaction mixture). The concentration of free alkylene oxides in the reaction mixture during the reaction (step $\gamma$) is preferably >0 to ≤40 wt %, more preferably >0 to ≤25 wt %, most preferably >0 to ≤15 wt %. (based in each case on the weight of the reaction mixture).

In a further embodiment of the stirred tank for the copolymerization (step $\gamma$), one or more H-functional starter compounds may also be metered into the reactor continuously during the reaction. The amount of the H-functional starter compounds metered into the reactor continuously during the reaction is preferably at least 20 mol % equivalents, more preferably 70 to 95 mol % equivalents (based in each case on the total amount of H-functional starter compounds). In the case of continuous performance of the process, the amount of the H-functional starter compounds which are metered continuously into the reactor during the reaction is preferably at least 80 mol % equivalents, more preferably 95 to 100 mol % equivalents (based in each case on the total amount of H-functional starter compounds).

In a preferred embodiment, the catalyst-starter mixture activated as per steps ($\alpha$) and ($\beta$) is reacted further with alkylene oxides and carbon dioxide in the same reactor. In a further preferred embodiment, the catalyst-starter mixture activated as per steps ($\alpha$) and ($\beta$) is reacted further with alkylene oxides and carbon dioxide in another reaction vessel (for example a stirred tank, tubular reactor or loop reactor). In another preferred embodiment, the mixture prepared as per step ($\alpha$) is reacted in a different reaction vessel (for example, a stirred tank, tubular reactor, or loop reactor) with alkylene oxides and carbon dioxide as per steps ($\beta$) and ($\gamma$).

In the case of reaction carried out in a tubular reactor, the mixture prepared as per step ($\alpha$) or the mixture activated as per steps ($\alpha$) and ($\beta$), and optionally starters and also alkylene oxides and carbon dioxide, are pumped continuously through a tube. When a mixture prepared according to step ($\alpha$) is used, the second activation stage of step ($\beta$) takes place in the first part of the tubular reactor, and the terpolymerization as per step ($\gamma$) takes place in the second part of the tubular reactor. The molar ratios of the co-reactants may vary according to the desired polymer.

In a preferred embodiment, carbon dioxide is metered in here in its liquid or supercritical form, in order to enable optimal miscibility of the components. The carbon dioxide can be introduced in the reactor at the inlet of the reactor and/or via metering points arranged along the reactor. A portion of the alkylene oxides may be introduced at the inlet of the reactor. The remaining amount of the alkylene oxides is preferably introduced into the reactor via a plurality of metering points arranged along the reactor. Mixing elements of the kind sold, for example, by Ehrfeld Mikrotechnik BTS GmbH are advantageously installed for more effective mixing of the co-reactants, or mixer-heat exchanger elements, which at the same time improve mixing and heat removal. The mixing elements preferably mix metered-in $CO_2$ and/or alkylene oxides with the reaction mixture. In an alternative embodiment, different volume elements of the reaction mixture can be mixed with one another.

Loop reactors or stirred tanks operated continuously or batchwise may likewise be used for preparing low-viscosity polyethercarbonate polyols having side chains. These generally include reactors having internal and/or external material recycling (optionally with heat exchange surfaces arranged in the circulation system), for example a jet loop reactor or Venturi loop reactor, which can also be operated continuously, or a tubular reactor designed in the form of a loop with suitable apparatuses for the circulation of the reaction mixture, or a loop of several series-connected tubular reactors or a plurality of series-connected stirred tanks.

Where reaction takes place in a continuously operated stirred tank or in a loop reactor, the reactants are pumped continuously through a continuously operating stirred tank or a loop reactor. When a mixture prepared as per step ($\alpha$) is used, the second activation stage as per step ($\beta$) takes place simultaneously with the terpolymerization of step ($\gamma$) in the continuously operated stirred tank or in a loop reactor. The molar ratios of the co-reactants may vary according to the desired polymer. The use of a continuously operated stirred tank or loop reactor is especially advantageous because in this case, in step ($\gamma$) or in steps ($\beta$) and ($\gamma$), backnixing can be realized, and so the concentration of free alkylene oxides in the reaction mixture can be kept in the optimum range, preferably in the range>0 to ≤40 wt %, more preferably >0 to ≤25 wt %, most preferably >0 to ≤15 wt % (based in each case on the weight of the reaction mixture).

Furthermore, the use of a continuously operated stirred tank or of a loop reactor has the advantage that the side chains are incorporated into the polymer chain randomly with consistent probability, producing particularly advantageous product properties such as particularly low viscosities, for example.

The polyethercarbonate polyols are preferably prepared in a continuous process. This process may comprise either a continuous copolymerization or else a continuous addition of the one or more H-functional starter substances. Also a subject of the invention, therefore, is a process in which in step (γ) one or more H-functional starter substances, DMC catalyst, and at least two alkylene oxides are metered into the reactor continuously, the difference in molecular weights of the lightest and heaviest of the metered-in alkylene oxides being greater than or equal to 24 g/mol, and the lightest alkylene oxide being a C2-C4 alkylene oxide, in the presence of carbon dioxide ("copolymerization"), with a proportion of the resulting reaction mixture (comprising the reaction product) being removed from the reactor continuously. In this case, in step (γ), the DMC catalyst is preferably added continuously in suspension in H-functional starter compound.

The term "continuously" used here can be defined as the mode of addition of a relevant catalyst or reactant such that an essentially continuous effective concentration of the DMC catalyst or the reactant is maintained. The catalyst can be fed in a truly continuous manner or in relatively closely spaced increments. Equally, a continuous addition of starter can be effected in a truly continuous manner or in increments. There would be no departure from the present process in adding a DMC catalyst or reactants incrementally such that the concentration of the materials added drops essentially to zero for a period of time before the next incremental addition. However, it is preferable for the DMC catalyst concentration to be kept substantially at the same concentration during the main portion of the course of the continuous reaction, and for starter substance to be present during the main portion of the copolymerization process. An incremental addition of DMC catalyst and/or reactant which does not substantially influence the nature of the product is nevertheless "continuous" in that sense in which the term is being used here. One feasible option is, for example, to provide a recycling loop in which a portion of the reacting mixture is recycled to a prior point in the process, as a result of which discontinuities brought about by incremental additions are smoothed out.

In order to achieve full conversion, the reaction apparatus in which step (γ) is carried out may frequently be followed by a further tank or a tube ("delay tube") in which residual concentrations of free alkylene oxides present after the reaction are depleted by reaction. Preferably, the pressure in this downstream reactor is at the same pressure as in the reaction apparatus in which reaction step (γ) is performed. The pressure in the downstream reactor can, however, also be selected at a higher or lower level. In a further preferred embodiment, the carbon dioxide, after reaction step (γ), is fully or partly released and the downstream reactor is operated at standard pressure or a slightly elevated pressure. The temperature in the downstream reactor is preferably 10 to 150° C. and more preferably 20 to 100° C. At the end of the post-reaction time or at the outlet of the downstream reactor, the reaction mixture may contain preferably less than 0.05 wt % of alkylene oxides. The post-reaction time or the residence time in the downstream reactor is preferably 10 min to 24 h, especially preferably 10 min to 3 h.

The suspension media which are used in step (α) for suspending the catalyst contain no H-functional groups. Suitable suspension media are all polar aprotic, weakly polar aprotic and nonpolar aprotic solvents, none of which contain any H-functional groups. As suspension medium it is also possible to use a mixture of two or more of these suspension media. The following polar aprotic solvents are mentioned here by way of example: 4-methyl-2-oxo-1,3-dioxolane (also referred to below as cyclic propylene carbonate), 1,3-dioxolan-2-one, acetone, methyl ethyl ketone, acetonitrile, nitromethane, dimethyl sulfoxide, sulfolane, dimethylformamide, dimethylacetamide and N-methylpyrrolidone. The group of the nonpolar and weakly polar aprotic solvents includes, for example, ethers, for example dioxane, diethyl ether, methyl tert-butyl ether and tetrahydrofuran, esters, for example ethyl acetate and butyl acetate, hydrocarbons, for example pentane, n-hexane, benzene and alkylated benzene derivatives (e.g. toluene, xylene, ethylbenzene) and chlorinated hydrocarbons, for example chloroform, chlorobenzene, dichlorobenzene and carbon tetrachloride. Preferred suspension media are 4-methyl-2-oxo-1,3-dioxolane, 1,3-dioxolan-2-one, toluene, xylene, ethylbenzene, chlorobenzene and dichlorobenzene, and mixtures of two or more of these suspension media; particular preference is given to 4-methyl-2-oxo-1,3-dioxolane and 1,3-dioxolan-2-one or a mixture of 4-methyl-2-oxo-1,3-dioxolane and 1,3-dioxolan-2-one.

In one alternative embodiment, suspension media used in step (a) for suspending the catalyst are one or more compounds selected from the group consisting of aliphatic lactones, aromatic lactones, lactides, cyclic carbonates having at least three optionally substituted methylene groups between the oxygen atoms of the carbonate group, aliphatic cyclic anhydrides, and aromatic cyclic anhydrides. Without being tied to a theory, suspension media of this kind are incorporated into the polymer chain in the subsequent course of the ongoing polymerization in the presence of a starter. As a result, there is no need for downstream purification steps.

Aliphatic or aromatic lactones are cyclic compounds containing an ester bond in the ring. Preferred compounds are 4-membered-ring lactones such as β-propiolactone, β-butyrolactone, β-isovalerolactone, β-caprolactone, β-isocaprolactone, β-methyl-β-valerolactone, 5-membered-ring lactones, such as γ-butyrolactone, γ-valerolactone, 5-methylfuran-2(3H)-one, 5-methylidenedihydrofuran-2(3H)-one, 5-hydroxyfuran-2(5H)-one, 2-benzofuran-1(3-H)-one and 6-methyl-2-benzofuran-1 (3H)-one, 6-membered-ring lactones, such as δ-valerolactone, 1,4-dioxan-2-one, dihydrocoumarin, 1H-isochromen-1-one, 8H-pyrano[3,4-b]pyridin-8-one, 1,4-dihydro-3H-isochromen-3-one, 7,8-dihydro-5H-pyrano[4,3-b]pyridin-5-one, 4-methyl-3,4-dihydro-1H-pyrano[3,4-b]pyridin-1-one, 6-hydroxy-3,4-dihydro-1H-isochromen-1-one, 7-hydroxy-3,4-dihydro-2H-chromen-2-one, 3-ethyl-1H-isochromen-1-one, 3-(hydroxymethyl)-1H-isochromen-1-one, 9-hydroxy-1H,3H-benzo[de]isochromen-1-one, 6,7-dimethoxy-1,4-dihydro-3H-isochromen-3-one and 3-phenyl-3,4-dihydro-1H-isochromen-1-one, 7-membered-ring lactones, such as ε-caprolactone, 1,5-dioxepan-2-one, 5-methyloxepan-2-one, oxepane-2,7-dione, thiepan-2-one, 5-chlorooxepan-2-one, (4S)-4-(propan-2-yl)oxepan-2-one, 7-butyloxepan-2-one, 5-(4-aminobutyl)oxepan-2-one, 5-phenyloxepan-2-one, 7-hexyloxepan-2-one, (5S,7S)-5-methyl-7-(propan-2-yl)oxepan-2-one, 4-methyl-7-(propan-2-yl)oxepan-2-one, and lactones with higher numbers of ring members, such as (7E)-oxacycloheptadec-7-en-2-one.

Lactides are cyclic compounds containing two or more ester bonds in the ring. Preferred compounds are glycolide (1,4-dioxane-2,5-dione), L-lactide (L-3,6-dimethyl-1,4-dioxane-2,5-dione), D-lactide, DL-lactide, mesolactide and 3-methyl-1,4-dioxane-2,5-dione, 3-hexyl-6-methyl-1,4-dioxane-2,5-dione, 3,6-di(but-3-en-1-yl)-1,4-dioxane-2,5-dione (in each case inclusive of optically active forms). Particular preference is given to L-lactide.

Cyclic carbonates used are preferably compounds having at least three optionally substituted methylene groups between the oxygen atoms of the carbonate group. Preferred compounds are trimethylene carbonate, neopentyl glycol carbonate (5,5-dimethyl-1,3-dioxan-2-one), 2,2,4-trimethyl-1,3-pentanediol carbonate, 2,2-dimethyl-1,3-butanediol carbonate, 1,3-butanediol carbonate, 2-methyl-1,3-propanediol carbonate, 2,4-pentanediol carbonate, 2-methylbutan-1,3-diol carbonate, TMP-monoallyl ether carbonate, pentaerythritol diallyl ether carbonate, 5-(2-hydroxyethyl)-1,3-dioxan-2-one, 5-[2-(benzyloxy)ethyl]-1,3-dioxan-2-one, 4-ethyl-1,3-dioxolan-2-one, 1,3-dioxolan-2-one, 5-ethyl-5-methyl-1,3-dioxan-2-one, 5,5-diethyl-1,3-dioxan-2-one, 5-methyl-5-propyl-1,3-dioxan-2-one, 5-(phenylamino)-1,3-dioxan-2-one and 5,5-dipropyl-1,3-dioxan-2-one. Particular preference is given to trimethylene carbonate and neopentyl glycol carbonate.

Under the conditions of the process of the invention for the copolymerization of epoxides and $CO_2$, cyclic carbonates having fewer than three optionally substituted methylene groups between the oxygen atoms of the carbonate group are incorporated into the polymer chain not at all or only to a small extent.

However, cyclic carbonates having fewer than three optionally substituted methylene groups between the oxygen atoms of the carbonate group may be used together with other suspension media. Preferred cyclic carbonates having fewer than three optionally substituted methylene groups between the oxygen atoms of the carbonate group are ethylene carbonateylene carbonate, propylene carbonate, 2,3-butanediol carbonate, 2,3-pentanediol carbonate, 2-methyl-1,2-propanediol carbonate and 2,3-dimethyl-2,3-butanediol carbonate.

Cyclic anhydrides used are cyclic compounds containing an anhydride group in the ring. Preferred compounds are succinic anhydride, maleic anhydride, phthalic anhydride, 1,2-cyclohexanedicarboxylic anhydride, diphenic anhydride, tetrahydrophthalic anhydride, methyltetrahydrophthalic anhydride, norbornenedioic anhydride and the chlorination products thereof, succinic anhydride, glutaric anhydride, diglycolic anhydride, 1,8-naphthalic anhydride, succinic anhydride, dodecenylsuccinic anhydride, tetradecenylsuccinic anhydride, hexadecenylsuccinic anhydride, octadecenylsuccinic anhydride, 3- and 4-nitrophthalic anhydride, tetrachlorophthalic anhydride, tetrabromophthalic anhydride, itaconic anhydride, dimethylmaleic anhydride, allylnorbornenedioic anhydride, 3-methylfuran-2,5-dione, 3-methyldihydrofuran-2,5-dione, dihydro-2H-pyran-2,6(3H)-dione, 1,4-dioxane-2,6-dione, 2H-pyran-2,4,6(3H, 5H)-trione, 3-ethyldihydrofuran-2,5-dione, 3-methoxydihydrofuran-2,5-dione, 3-(prop-2-en-1-yl)dihydrofuran-2,5-dione, N-(2,5-dioxotetrahydrofuran-3-yl)formamide and 3[(2E)-but-2-en-1-yl]dihydrofuran-2,5-dione. Particular preference is given to succinic anhydride, maleic anhydride and phthalic anhydride.

For the synthesis of the polymer chains of the low-viscosity polyethercarbonate polyols, H-functional starter compounds (starters) are used that have H atoms that are active for the alkoxylation. Groups active for the alkoxylation and having active H atoms are, for example, —OH, —$NH_2$ (primary amines), —NH— (secondary amines), —SH, and —$CO_2H$, preferably —OH and —$NH_2$, more preferably —OH. As H-functional starter compound, use is made, for example, of one or more compounds selected from the group consisting of mono- or polyhydric alcohols, polyfunctional amines, polyfunctional thiols, amino alcohols, thio alcohols, hydroxy esters, polyether polyols, polyester polyols, polyesterether polyols, polyethercarbonate polyols, polycarbonate polyols, polycarbonates, polyethyleneimines, polyetheramines (e.g. so-called Jeffamine® products from Huntsman, such as D-230, D-400, D-2000, T-403, T-3000, T-5000, or corresponding products from BASF, such as Polyetheramine D230, D400, D200, T403, T5000), polytetrahydrofurans (e.g. PolyTHF® from BASF, such as PolyTHF® 250, 650S, 1000, 1000S, 1400, 1800, 2000), polytetrahydrofuranamines (BASF product Polytetrahydrofuranamine 1700), polyetherthiols, polyacrylate polyols, the mono- or diglyceride of ricinolic acid, monoglycerides of fatty acids, chemically modified mono-, di- and/or triglycerides of fatty acids, and C1-C24 alkyl fatty acid esters which contain on average 2 OH groups per molecule. The C1-C24 alkyl fatty acid esters which contain on average 2 OH groups per molecule are for example commercial products such as Lupranol Balance® (from BASF AG), Merginol® products (from Hobum Oleochemicals GmbH), Sovermol® products (from Cognis Deutschland GmbH & Co. KG), and Soyol® products (from USSC Co).

The monofunctional starter compounds used may be alcohols, amines, thiols and carboxylic acids. The monofunctional alcohols used may be: methanol, ethanol, 1-propanol, 2-propanol, 1-butanol, 2-butanol, tert-butanol, 3-buten-1-ol, 3-butyn-1-ol, 2-methyl-3-buten-2-ol, 2-methyl-3-butyn-2-ol, propargyl alcohol, 2-methyl-2-propanol, 1-tert-butoxy-2-propanol, 1-pentanol, 2-pentanol, 3-pentanol, 1-hexanol, 2-hexanol, 3-hexanol, 1-heptanol, 2-heptanol, 3-heptanol, 1-octanol, 2-octanol, 3-octanol, 4-octanol, phenol, 2-hydroxybiphenyl, 3-hydroxybiphenyl, 4-hydroxybiphenyl, 2-hydroxypyridine, 3-hydroxypyridine, 4-hydroxypyridine. Useful monofunctional amines include: butylamine, tert-butylamine, pentylamine, hexylamine, aniline, aziridine, pyrrolidine, piperidine, morpholine. The monofunctional thiols used may be: ethanethiol, 1-propanethiol, 2-propanethiol, 1-butanethiol, 3-methyl-1-butanethiol, 2-butene-1-thiol, thiophenol. Monofunctional carboxylic acids include: formic acid, acetic acid, propionic acid, butyric acid, fatty acids such as stearic acid, palmitic acid, oleic acid, linoleic acid, linolenic acid, benzoic acid, acrylic acid.

Suitability as H-functional starter compounds may be ascribed to dihydric alcohols (such as, for example, ethylene glycol, diethylene glycol, propylene glycol, dipropylene glycol, 1,3-propanediol, 1,4-butanediol, 1,4-butenediol, 1,4-butynediol, neopentyl glycol, 1,5-pentanediol, methylpentanediols (such as 3-methyl-1,5-pentanediol, for example), 1,6-hexanediol, 1,8-octanediol, 1,10-decanediol, 1,12-dodecanediol, bis(hydroxymethyl)cyclohexanes (such as 1,4-bis(hydroxymethyl)cyclohexane, for example), triethylene glycol, tetraethylene glycol, polyethylene glycols, dipropylene glycol, tripropylene glycol, polypropylene glycols, dibutylene glycol and polybutylene glycols, and also all modification products of these aforementioned alcohols with different amounts of ε-caprolactone.

The H-functional starter compounds may also be selected from the substance class of the polyether polyols, especially those having a molecular weight $M_n$ in the range from 100 to 4000 g/mol. Preference is given to polyether polyols formed from repeating ethylene oxide and propylene oxide units, preferably having a proportion of 35 to 100% propylene oxide units, more preferably having a proportion of 50 to 100% propylene oxide units. These may be random copolymers, gradient copolymers, alternating copolymers or block copolymers of ethylene oxide and propylene oxide.

Suitable polyether polyols composed of repeating propylene oxide and/or ethylene oxide units are, for example, the Desmophen®, Acclaim®, Arcol®, Baycoll®, Bayfill®, Bayflex® Baygal®, PET® and polyether polyols from Bayer MaterialScience AG (for example, Desmophen® 3600Z, Desmophen® 1900U, Acclaim® Polyol 2200, Acclaim® Polyol 40001, Arcol® Polyol 1004, Arcol® Polyol 1010, Arcol® Polyol 1030, Arcol® Polyol 1070, Baycoll® BD 1110, Bayfill® VPPU 0789, Baygal® K55, PET® 1004, Polyether® S180). Further suitable homopolyethylene oxides are, for example, the Pluriol® E products from BASF SE; suitable homo-polypropylene oxides are, for example, the Pluriol® P products from BASF SE; suitable mixed copolymers of ethylene oxide and propylene oxide are, for example, the Pluronic® PE or Pluriol® RPE products from BASF SE.

The H-functional starter compounds may also be selected from the substance class of the polyester polyols, especially those having a molecular weight $M_n$ in the range from 200 to 4500 g/mol. Polyesters having a functionality of at least two can be used as polyester polyols. Preferably, polyester polyols consist of alternating acid and alcohol units. The acid components used are, for example, succinic acid, maleic acid, maleic anhydride, adipic acid, phthalic anhydride, phthalic acid, isophthalic acid, terephthalic acid, tetrahydrophtalic acid, tetrahydrophthalic anhydride, hexahydrophthalic anhydride or mixtures of the acids and/or anhydrides mentioned. Alcohol components used are, for example, ethanediol, 1,2-propanediol, 1,3-propanediol, 1,4-butanediol, 1,5-pentanediol, neopentyl glycol, 1,6-hexanediol, 1,4-bis(hydroxymethyl)cyclohexane, diethylene glycol, dipropylene glycol, or mixtures of the stated alcohols. Where dihydric polyether polyols are used as alcohol component, the product comprises polyesterether polyols, which may likewise serve as starter compounds for preparing the polyethercarbonate polyols. Polyether polyols with $M_n=150$ to 2000 g/mol are used preferably for preparing the polyesterether polyols.

As H-functional starter compounds it is possible, furthermore, to use polycarbonate diols, more particularly those having a molecular weight MA in the range from 150 to 4500 g/mol, preferably 500 to 2500 g/mol, which are prepared, for example, by reaction of phosgene, dimethyl carbonate, diethyl carbonate or diphenyl carbonate and difunctional alcohols or polyester polyols or polyether polyols. Examples of polycarbonates can be found, for example, in EP-A 1359177. For example, the polycarbonate diols used may be the Desmophen® C products from Bayer MaterialScience AG, for example Desmophen® C 1100 or Desmophen® C 2200.

In a further embodiment of the invention, polyethercarbonate polyols and/or polyetherestercarbonate polyols can be used as H-functional starter compounds. It is possible more particularly to use polyetherestercarbonate polyols which are obtainable by the inventively useful process described here. For this purpose, these polyetherestercarbonate polyols used as H-functional starter compounds are prepared in a separate reaction step beforehand.

The H-functional starter compounds generally have an OH functionality (i.e., number of polymerization-active H atoms per molecule) of 0.8 to 3, preferably of 0.9 to 2.1, and more preferably of 0.95 to 2.05. The H-functional starter compounds are used either individually or as a mixture of at least two H-functional starter compounds.

Preferred H-functional starter compounds are alcohols having a composition according to the general formula (III),

$$\text{HO}-(\text{CH}_2)x\text{-OH} \qquad \text{(III)}$$

where x is a number from 1 to 20, preferably an integer from 2 to 20. Examples of alcohols of formula (III) are ethylene glycol, 1,4-butanediol, 1,6-hexanediol, 1,8-octanediol, 1,10 decanediol, and 1,12-dodecanediol. Further preferred H-functional starter compounds are neopentyl glycol and reaction products of the alcohols of formula (III) with ε-caprolactone. Additionally preferred as H-functional starter compounds are water, diethylene glycol, dipropylene glycol, and polyether polyols composed of repeating polyalkylene oxide units.

With particular preference the H-functional starter compounds comprise one or more compounds selected from the group consisting of ethylene glycol, propylene glycol, 1,3-propanediol, 1,3-butanediol, 1,4-butanediol, 1,5-pentanediol, 2-methylpropane-1,3-diol, neopentyl glycol, 1,6-hexanediol, diethylene glycol, dipropylene glycol, difunctional polyetherpolyols, the polyether polyol being synthesized from a di-H-functional starter compound and propylene oxide or from a di-H-functional starter compound, propylene oxide and ethylene oxide. The polyether polyols preferably have an OH functionality of 0.9 to 2.1 and a molecular weight $M_n$ in the range from 62 to 4500 g/mol, and more particularly a molecular weight $M_n$ in the range from 62 to 3000 g/mol.

As catalyst for preparing the low-viscosity polyethercarbonate polyols of the invention having side chains, preference is given as stated to using a DMC catalyst (double metal cyanide catalyst). Additionally or alternatively it is also possible to use other catalysts for the copolymerization of alkylene oxides and $CO_2$ active catalysts, such as zinc carboxylates or cobalt-salen complexes, for example. Examples of suitable zinc carboxylates are zinc salts of carboxylic acids, especially dicarboxylic acids, such as adipic acid or glutaric acid. An overview of the known catalysts for the copolymerization of alkylene oxides and $CO_2$ is provided for example by Chemical Communications 47 (2011) 141-163.

The double metal cyanide compounds present DMC catalysts which can be used with preference in the process of the invention are the reaction products of water-soluble metal salts and water-soluble metal cyanide salts.

Double metal cyanide (DMC) catalysts are known from the prior art for the homopolymerization of alkylene oxides (see, for example, U.S. Pat. No. 3,404,109, U.S. Pat. No. 3,829,505, U.S. Pat. No. 3,941,849, and U.S. Pat. No. 5,158,922). DMC catalysts, which are described in, for example, U.S. Pat. No. 5,470,813, EP-A 700 949, EP-A 743 093, EP-A 761 708, WO 97/40086 A1, WO 98/16310 A1, and WO 00/47649 A1, possess a very high activity and allow the preparation of polyethercarbonate polyols at very low catalyst concentrations. A typical example is that of the highly active DMC catalysts which are described in EP-A 700 949 and contain, as well as a double metal cyanide compound (e.g. zinc hexacyanocobaltate(III)) and an organic complex ligand (e.g. tert-butanol), also a polyether having a number-average molecular weight greater than 500 g/mol.

The DMC catalysts which can be used in accordance with the invention are preferably obtained by (a) reacting in the first step an aqueous solution of a metal salt with the aqueous solution of a metal cyanide salt in the presence of one or more organic complex ligands, e.g. of an ether or alcohol, (B) with removal in the second step of the solid from the suspension obtained from (a), by means of known techniques (such as centrifugation or filtration), (c) with optional washing in a third step of the isolated solid with an aqueous solution of an organic complex ligand (for example by resuspending and subsequently reisolating by filtration or centrifugation), (d) with subsequent drying of the solid obtained, optionally after pulverization, at temperatures of generally 20-120° C. and at pressures of generally 0.1 mbar to standard pressure (1013 mbar), and with addition, in the first step or immediately after the precipitation of the double metal cyanide compound (second step), of one or more organic complex ligands, preferably in excess (based on the double metal cyanide compound), and optionally of further complex-forming components.

The double metal cyanide compounds included in the DMC catalysts which can be used in accordance with the invention are the reaction products of water-soluble metal salts and water-soluble metal cyanide salts.

For example, an aqueous zinc chloride solution (preferably in excess relative to the metal cyanide salt) and potassium hexacyanocobaltate are mixed and then dimethoxyethane (glyme) or tert-butanol (preferably in excess, relative to zinc hexacyanocobaltate) is added to the resulting suspension.

Metal salts suitable for preparation of the double metal cyanide compounds preferably have a composition according to the general formula (IV), $$M(X)_n \qquad (IV)$$

where
M is selected from the metal cations $Zn^{2+}$, $Fe^{2+}$, $Ni^{2+}$, $Mn^{2+}$, $Co^{2+}$, $Sr^{2+}$, $Sn^{2+}$, $Pb^{2+}$ and $Cu^{2+}$; M is preferably $Zn^{2+}$, $Fe^{2+}$, $Co^{2+}$ or $Ni^{2+}$,
X is one or more (i.e. different) anions, preferably an anion selected from the group of the halides (i.e. fluoride, chloride, bromide, iodide), hydroxide, sulfate, carbonate, cyanate, thiocyanate, isocyanate, isothiocyanate, carboxylate, oxalate and nitrate;
n is 1 when X=sulfate, carbonate or oxalate and
n is 2 when X=halide, hydroxide, carboxylate, cyanate, thiocyanate, isocyanate, isothiocyanate or nitrate,
or suitable metal salts have a composition according to the general formula (V), $$M_r(X)_3 \qquad (V)$$

where
M is selected from the metal cations $Fe^{3+}$, $Al^{3+}$, $Co^{3+}$ and $Cr^{3+}$,
X is one or more (i.e. different) anions, preferably an anion selected from the group of the halides (i.e. fluoride, chloride, bromide, iodide), hydroxide, sulfate, carbonate, cyanate, thiocyanate, isocyanate, isothiocyanate, carboxylate, oxalate and nitrate;
r is 2 when X=sulfate, carbonate or oxalate and
r is 1 when X=halide, hydroxide, carboxylate, cyanate, thiocyanate, isocyanate, isothiocyanate or nitrate, or suitable metal salts have a composition according to the general formula (VI), $$M(X)_s \qquad (VI)$$

where
M is selected from the metal cations $Mo^{4+}$, $V^{4+}$ and $W^{4+}$,
X is one or more (i.e. different) anions, preferably an anion selected from the group of the halides (i.e. fluoride, chloride, bromide, iodide), hydroxide, sulfate, carbonate, cyanate, thiocyanate, isocyanate, isothiocyanate, carboxylate, oxalate and nitrate;
s is 2 when X=sulfate, carbonate or oxalate and
s is 4 when X=halide, hydroxide, carboxylate, cyanate, thiocyanate, isocyanate, isothiocyanate or nitrate,
or suitable metal salts have a composition according to the general formula (VII), $$M(X)_t \qquad (VII)$$

where
M is selected from the metal cations $Mo^{6+}$ and $W^{6+}$,
X is one or more (i.e. different) anions, preferably an anion selected from the group of the halides (i.e. fluoride, chloride, bromide, iodide), hydroxide, sulfate, carbonate, cyanate, thiocyanate, isocyanate, isothiocyanate, carboxylate, oxalate and nitrate;
t is 3 when X=sulfate, carbonate or oxalate and
t is 6 when X=halide, hydroxide, carboxylate, cyanate, thiocyanate, isocyanate, isothiocyanate or nitrate.

Examples of suitable metal salts are zinc chloride, zinc bromide, zinc iodide, zinc acetate, zinc acetylacetonate, zinc benzoate, zinc nitrate, iron(II) sulfate, iron(II) bromide, iron(II) chloride, iron(III) chloride, cobalt(II) chloride, cobalt(II) thiocyanate, nickel(II) chloride and nickel(II) nitrate. It is also possible to use mixtures of different metal salts.

Metal cyanide salts suitable for preparing the double metal cyanide compounds preferably have a composition according to the general formula (VIII), $$(Y)_a M'(CN)_b (A)_c \qquad (VIII)$$

where
M' is selected from one or more metal cations from the group consisting of Fe(II), Fe(III), Co(II), Co(III), Cr(II), Cr(III), Mn(II), Mn(III), Ir(III), Ni(II), Rh(III), Ru(II), V(IV) and V(V); M' is preferably one or more metal cations from the group consisting of Co(II), Co(III), Fe(II), Fe(III), Cr(III), Ir(III) and Ni(II), Y is selected from one or more metal cations from the group consisting of alkali metal (i.e. $Li^+$, $Na^+$, $K^+$, $Rb^+$) and alkaline earth metal (i.e. $Be^{2+}$, $Mg^{2+}$, $Ca^{2+}$, $Sr^{2+}$, $Ba^{2+}$),
A is selected from one or more anions from the group consisting of halides (i.e. fluoride, chloride, bromide, iodide), hydroxide, sulfate, carbonate, cyanate, thiocyanate, isocyanate, isothiocyanate, carboxylate, azide, oxalate and nitrate, and
a, b and c are integral numbers, the values for a, b and c being selected such as to ensure the electroneutrality of the metal cyanide salt; a is preferably 1, 2, 3 or 4; b is preferably 4, 5 or 6; c preferably possesses the value 0.

Examples of suitable metal cyanide salts are sodium hexacyanocobaltate(III), potassium hexacyanocobaltate (III), potassium hexacyanoferrate(II), potassium hexacyanoferrate(III), calcium hexacyanocobaltate(III) and lithium hexacyanocobaltate(III).

Preferred double metal cyanide compounds which are present in the DMC catalysts useful in accordance with the invention are compounds having a composition according to the general formula (IX), $$M_x[M'_{x'}(CN)_y]_z \qquad (IX)$$

in which M is defined as in formula (IV) to (VII) and M' is defined as in formula (IIX), and x, x', y and z are integral and are selected such as to provide for the electron neutrality of the double metal cyanide compound.

Preferably, x=3, x'=1, y=6 and z=2,

M=Zn(II), Fe(II), Co(II) or Ni(II) and

M'=Co(III), Fe(III), Cr(III) or Ir(III).

Examples of suitable double metal cyanide compounds a) are zinc hexacyanocobaltate(III), zinc hexacyanoiridate(III), zinc hexacyanoferrate(III) and cobalt(II) hexacyanocobaltate(III). Further examples of suitable double metal cyanide compounds can be found, for example, in U.S. Pat. No. 5,158,922 (column 8, lines 29-66). Particular preference is given to using zinc hexacyanocobaltate(III).

The organic complex ligands added in the preparation of the DMC catalysts are disclosed, for example, in U.S. Pat. No. 5,158,922 (see especially column 6 lines 9 to 65), U.S. Pat. No. 3,404,109, U.S. Pat. No. 3,829,505, U.S. Pat. No. 3,941,849, EP-A 700 949, EP-A 761 708, JP 4 145 123, U.S. Pat. No. 5,470,813, EP-A 743 093 and WO-A 97/40086). For example, the organic complex ligands used are water-soluble, organic compounds having heteroatoms such as oxygen, nitrogen, phosphorus or sulfur, which can form complexes with the double metal cyanide compound. Preferred organic complex ligands are alcohols, aldehydes, ketones, ethers, esters, amides, ureas, nitriles, sulfides and mixtures thereof. Particularly preferred organic complex ligands are aliphatic ethers (such as dimethoxyethane), water-soluble aliphatic alcohols (such as ethanol, isopropanol, n-butanol, iso-butanol, sec-butanol, tert-butanol, 2-methyl-3-buten-2-ol and 2-Methyl-3-butyn-2-ol), compounds which contain both aliphatic or cycloaliphatic ether groups and aliphatic hydroxyl groups (such as ethylene glycol mono-tert-butyl ether, diethylene glycol mono-tert-butyl ether, tripropylene glycol mono-methyl ether, and 3-methyl-3-oxetanemethanol, for example). Extremely preferred organic complex ligands are selected from one or more compounds of the group consisting of dimethoxyethane, tert-butanol 2-methyl-3-buten-2-ol, 2-methyl-3-butyn-2-ol, ethylene glycol mono-tert-butyl ether, and 3-methyl-3-oxetanemethanol.

In the preparation of the inventively useful DMC catalysts, use is made optionally of one or more complex-forming components from the classes of compound of the polyethers, polyesters, polycarbonates, polyalkylene glycol sorbitan esters, polyalkylene glycol glycidyl ethers, polyacrylamide, poly(acrylamide-co-acrylic acid), polyacrylic acid, poly(acrylic acid-co-maleic acid), polyacrylonitrile, polyalkyl acrylates, polyalkyl methacrylates, polyvinyl methyl ether, polyvinyl ethyl ether, polyvinyl acetate, polyvinyl alcohol, poly-N-vinylpyrrolidone, poly(N-vinylpyrrolidone-co-acrylic acid), polyvinyl methyl ketone, poly(4-vinylphenol), poly(acrylic acid-co-styrene), oxazoline polymers, polyalkyleneimines, maleic acid and maleic anhydride copolymers, hydroxyethylcellulose and polyacetals, or of the glycidyl ethers, glycosides, carboxylic esters of polyhydric alcohols, gallic acids or their salts, esters or amides, cyclodextrins, phosphorus compounds, $\alpha,\beta$-unsaturated carboxylic esters, or ionic surface-active or interface-active compounds.

In the preparation of the DMC catalysts that can be used in accordance with the invention, preference is given to using the aqueous solutions of the metal salt (e.g. zinc chloride) in the first step in a stoichiometric excess (at least 50 mol %) relative to the metal cyanide salt. This corresponds at least to a molar ratio of metal salt to metal cyanide salt of 2.25:1.00. The metal cyanide salt (e.g. potassium hexacyanocobaltate) is reacted in the presence of the organic complex ligand (e.g. tert-butanol), and a suspension is formed which comprises the double metal cyanide compound (e.g. zinc hexacyanocobaltate), water, excess metal salt, and the organic complex ligand.

This organic complex ligand may be present in the aqueous solution of the metal salt and/or of the metal cyanide salt, or it is added directly to the suspension obtained after precipitation of the double metal cyanide compound. It has been found to be advantageous to mix the aqueous solutions of the metal salt and of the metal cyanide salt, and the organic complex ligand by stirring vigorously. Optionally, the suspension formed in the first step is subsequently treated with a further complex-forming component. The complex-forming component is preferably used in a mixture with water and organic complex ligand. A preferred process for performing the first step (i.e. the preparation of the suspension) is effected using a mixing nozzle, more preferably using a jet disperser, as described, for example, in WO-A 01/39883.

In the second step, the solid (i.e. the precursor of the inventive catalyst) is isolated from the suspension by known techniques, such as centrifugation or filtration.

In a preferred execution variant, the isolated solid is subsequently washed in a third process step with an aqueous solution of the organic complex ligand (for example by resuspension and subsequent reisolation by filtration or centrifugation). In this way, it is possible to remove, for example, water-soluble by-products such as potassium chloride from the inventive catalyst. The amount of the organic complex ligand in the aqueous wash solution is preferably between 40 and 80 wt %, based on the overall solution.

Optionally in the third step the aqueous wash solution is admixed with a further complex-forming component, preferably in a range between 0.5 and 5 wt %, based on the overall solution.

Moreover, it is advantageous to wash the isolated solid more than once. Washing takes place preferably, in a first washing step (c-1), with an aqueous solution of the unsaturated alcohol (by means, for example, of resuspension and subsequent reisolation by filtering or centrifugation), in order thereby to remove water-soluble by-products, such as potassium chloride, from the catalyst of the invention. The amount of the unsaturated alcohol in the aqueous wash solution is more preferably between 40 and 80 wt %, based on the overall solution of the first washing step. In the further washing steps (c-2) either the first washing step is repeated once or several times, preferably from one to three times, or, preferably, a nonaqueous solution, such as a mixture or solution of unsaturated alcohol and further complex-forming component (preferably in the range between 0.5 and 5 wt %, based on the total amount of the washing solution of step (c-2)), is used as the washing solution, and the solid is washed with it one or several times, preferably from one to three times.

The isolated and optionally washed solid is then dried, optionally after pulverization, at temperatures of 20-100° C. and at pressures of 0.1 mbar to atmospheric pressure (1013 mbar).

One particularly preferred method for isolating the DMC catalysts of the invention from the suspension, by filtration, filtercake washing, and drying, is described in WO-A 01/80994, for example.

The alkylene oxides with the lower molecular weight are preferably alkylene oxides having 2-4 carbon atoms. These alkylene oxides are identified below as alkylene oxides without side chains with the radicals $R_1$. They may for example be one or more compounds selected from the group consisting of ethylene oxide, propylene oxide, 2,3-butene oxide, 2-methyl-1,2-propene oxide (isobutene oxide). As alkylene oxides with the alkylene oxide radical $R_1$ it is preferred for ethylene oxide and/or propylene oxide to be used, especially propylene oxide. The low molecular weight alkylene oxides may in particular have at least one terminal oxirane ring.

The alkylene oxides with the higher molecular weight are alkylene oxides having a defined difference in molecular weight from the low molecular weight alkylene oxides, with these alkylene oxides carrying more bulky side chains $R_2$. These monomer groups with side chain-bearing radicals have proven particularly suitable in the context of a manageable operating regime and as monomers for obtaining polymeric products having a particularly low viscosity. In addition to the carbon and hydrogen atoms, these side chains may also have heteroatoms such as Si, N, P, O, S, and halogens, for example. The radicals here may be saturated or unsaturated, linear or cyclic, aromatic or aliphatic. The higher-molecular-mass alkylene oxides may in particular have at least one terminal oxirane ring.

In one particular embodiment of the process for preparing the polyethercarbonate polyols, low molecular weight alkylene oxides with the radical $R_1$ may be selected from the group encompassing H and methyl. These radicals $R_1$ without side chain have emerged as being particularly advantageous for implementing the process of the invention for preparing low-viscosity polyethercarbonate polyols, since these components have a sufficient reaction rate and contribute to chain extension accompanied by a minimal growth in the molecular weight of the polymer.

In a further embodiment of the process for preparing the polyethercarbonate polyols, the DMC catalyst may be selected from the group encompassing $Mx[M'x,(CN)y]z$, where: M=Zn(II), Fe(II), Co(II) or Ni(II); M'=Co(III), Fe(II), Cr(III) or Ir(II); and x=3, x'=1, y=6 and z=2. These DMC catalysts have proven particularly advantageous in the context of an effective operating regime in the terpolymerization, in the sense of a high selectivity and a high conversion, even at relatively low temperatures. More particularly it is also possible to use a DMC catalyst comprising zinc hexacyanocobaltate(III).

In a further embodiment of the process for preparing the polyethercarbonate polyols, the radical $R_2$ of the alkylene oxide having the higher molecular weight may be selected from the group encompassing unbranched or branched, saturated or unsaturated, C2-C60 alkyl optionally comprising heteroatoms, or cycloalkyl, alkenyl, alkynyl, heteroalkyl, alkoxy, aryl, heteroaryl, aryloxy, aralkyl, alkoxysilyl, and aroxysilyl. These radicals have proven particularly suitable with regard to a manageable operating regime and as monomers for obtaining polymeric products having a particularly low viscosity. The compounds with the radical $R_2$ used may for example be one or more compounds selected from the group consisting of 1-butene oxide, 1-pentene oxide, 2,3-pentene oxide, 2-methyl-1,2-butene oxide, 3-methyl-1,2-butene oxide, 1-hexene oxide, 2,3-hexene oxide, 3,4-hexene oxide, 2-methyl-1,2-pentene oxide, 4-methyl-1,2-pentene oxide, 2-ethyl-1,2-butene oxide, 1-heptene oxide, 1-octene oxide, 1-nonene oxide, 1-decene oxide, 1-undecene oxide, 1-dodecene oxide, 4-methyl-1,2-pentene oxide, butadiene monoxide, isoprene monoxide, cyclopentene oxide, cyclohexene oxide, cycloheptene oxide, cyclooctene oxide, styrene oxide, methylstyrene oxide, pinene oxide, singularly or multiply alkylene oxidized fats in the form of mono-, di-, and triglycerides, alkylene-oxidized fatty acids, C1-C24 esters of alkylene-oxidized fatty acids, epichlorohydrin, derivates of glycidol such as methyl glycidyl ether, ethyl glycidyl ether, 2-ethyl hexyl glycidyl ether, allyl glycidyl ether, glycidyl methacrylate, for example, and also alkylene oxide-functional alkoxysilanes such as, for example, 3-glycidyloxypropyltrimethoxysilane, 3-glycidyloxypropyltriethoxysilane, 3-glycidyloxypropyltripropoxysilane, 3-glycidyloxypropylmethyldimethoxysilane, 3-glycidyloxypropylethyethyldiethoxysilane, and 3-glycidyloxypropyltriisopropoxysilane.

In a further embodiment of the process of the invention for preparing the polyethercarbonate polyols, the temperature in step (β) may be greater than or equal to 100° C. and less than or equal to 150° C., and in step (γ) may be greater than or equal to 60° C. and less than or equal to 150° C. Step (γ) is carried out, for example, at temperatures of 60 to 150° C., preferably of 80 to 130° C., very preferably of 90 to 120° C. If temperatures below 60° C. are set, the polymerization reaction comes to a standstill. At temperatures above 150° C., there is a sharp rise in the quantity of unwanted byproducts. The temperature in reaction step (γ) is preferably below that of the reaction step (β). This can lead to rapid activation of the catalyst and to rapid and selective conversion in the polymerization reaction.

In an alternative embodiment of the process for preparing the polyethercarbonate polyols, the radical $R_2$ of the alkylene oxides may be selected from the group of C2-C15 alkyl or alkenyl. The use of saturated or unsaturated C2-C15 alkyl radicals $R_2$ specifically leads in the operation of the invention to a simple process regime and to a significant reduction in the viscosity of the resulting polyethercarbonate polyols. Example compounds from this class of compound have been specified earlier on above.

In a further embodiment of the process for preparing the polyethercarbonate polyols, carbon dioxide may be metered in likewise in step (β). The metered addition of carbon dioxide in reaction step (β) specifically can lead to better activation of the DMC catalyst, leading in turn to a better yield of the desired main product in the subsequent polymerization step (γ).

According to a further embodiment of the process of the invention for preparing the polyethercarbonate polyols, the radical $R_2$ alkylene oxides with the higher molecular weight can have at least one double bond. The introduction of unsaturated side chains into the polyethercarbonate polyol opens up the possibilities of utilizing them as linkage points for a subsequent crosslinking reaction. As a result, in addition to a low-viscosity linear polyethercarbonatepolyol, one with side chains is also obtained, which can be reacted flexibly and easily to give further compounds of high molecular weight. Example compounds from this class of compound have been specified earlier on above.

In a further characteristic of the process of the invention for preparing the polyethercarbonate polyols, at least one of the alkylene oxides metered in stages (β) and/or (γ) may have a C2-C15 alkyl or alkenyl group. These alkylene oxide substituents are especially capable of achieving a significant reduction in the viscosity of the polyethercarbonate polyols which also retain further parameters relevant to quality, such as selectivity and yield.

In a further subject of the process for preparing the polyethercarbonate polyols, at least one of the alkylene oxides metered in step (γ) may have been selected from the group of the glycidyl ethers, Glycidyl ethers have the general formula (X)

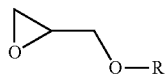 (X)

where R is a heteroatom-containing or non-heteroatom-containing C1-C30 aliphatic, aromatic, araliphatic or cycloaliphatic radical. Through their use in the terpolymerization, glycidyl ethers lead to particularly bulky side chains on the polyethercarbonate polyol, a feature which consequently contributes to a significantly reduced viscosity. Furthermore, the use of glycidyl ethers allows a simple operating regime, owing to their solubility and capacity for conversion over the DMC catalyst. Examples of glycidyl ethers which can be used are allyl glycidyl ether (AGE), p-tert-butylphenyl glycidyl ether (BPGE), 2-ethylhexyl glycidyl ether (EHGE), and glycidyl phenyl ether (GPE).

In an alternative embodiment of the process for preparing the polyethercarbonate polyols, the molar ratio of addition of the lightest to the heaviest alkylene oxide in steps (β) and (γ) in total may be greater than or equal to 5:1 and less than or equal to 1000:1. This molecular ratio for the mixing of the alkylene oxides leads to a significant reduction in the viscosity of the polyethercarbonate polyol and therefore results in greater ease of processing of the polymer. Smaller molar mixing ratios for the alkylene oxides of different weight are less favorable, since, as a result of increased incorporation of the side-chain bearing alkylene oxides, they would lead to an unnecessarily high molecular weight of the poyethercarbonate polyol. Larger molecular mixing ratios are less favorable, moreover, since they would lead, owing to lack of incorporation of a significant amount of $R_2$, to an inadequate decrease in the viscosity of the polyethercarbonate polyol.

In a further embodiment of the process for preparing polyethercarbonate polyols, a cyclic anhydride may be added additionally in step (β) and/or (γ). Through incorporation of the cyclic anhydrides, the resulting polyethercarbonate polyol contains ester groups as well as the ether groups and the carbonate groups. Via the addition of a cyclic anhydride in steps (β) and/or (γ), for example, further functional groups can be incorporated into the polyethercarbonate polyol. For instance, when using unsaturated cyclic anhydrides, double bonds are obtained along the polymer chain. In one preferred embodiment, the cyclic anhydride may comprise maleic anhydride.

Additionally in accordance with the invention is a polyethercarbonate polyol obtainable by the process of the invention where the viscosity of the polyethercarbonate polyol at 25° C. is ≥100 mPa·s and ≤20 000 mPa·s, preferably ≥200 mPa·s and ≤12 500 mPa·s, and very preferably 500 mPa·s and ≤6000 mPa·s. This viscosity range for the polyethercarbonate polyols obtainable from a terpolymerization of side chain-bearing monomers, non-side chain-bearing monomers, and carbon dioxide has proven particularly advantageous for the further processing of the polyethercarbonate polyols. This is especially so for further reactions of these polymers to give relatively high molecular weight plastics, which can have enhanced properties as a result of the use of particularly low-viscosity reactants. The determination of the viscosity of the polyethercarbonate polyol of the invention is described in the methods section.

In one preferred variant embodiment, the ratio of the carbonate ester groups to ether groups in the polyethercarbonate polyol may be ≥1:20 and ≤1:1, more preferably ≥1:8 and ≤1:2. This ratio for the carbonate ester groups to ether groups has proven particularly advantageous in the context of the operating regime and process economy. Higher fractions of carbonate ester groups may lead to an increased viscosity of the polyethercarbonate polyol.

In one preferred embodiment, the molecular weight $M_n$ (determined by gel permeation chromatography) of the polyethercarbonate polyol may be ≥400 and ≤10 000 000 g/mol. In one particularly preferred embodiment, the molecular weight $M_n$ may be ≥1000 and ≤1 000 000 g/mol and very preferably ≥2000 and ≤10 000 g/mol. In the context of the process of the invention, this molecular weight range can be prepared efficiently and economically, and the resultant polyethercarbonate polyols exhibit a significantly reduced viscosity by comparison with prior-art polyethercarbonates of comparable molecular weight. This greatly improves the technical handling qualities of the polyethercarbonate polyols of the invention.

In one particular embodiment according to the invention, the OH functionality of the polyethercarbonate polyol may be ≥0.8 and ≤3.0. In addition to the viscosity, the OH functionality of the polymer may be an important parameter for adjusting the reactivity of the polyethercarbonate polyols in further conversion reactions. In comparison to their counterparts without side chains, the polyethercarbonate polyols of the invention have a lower viscosity for a given OH number, thereby enhancing the technical handling qualities.

In a further embodiment, the fraction of the heaviest alkylene oxide incorporated into the polyethercarbonate polyol may be ≥1 mol % and ≤20 mol %. Within this range of use, a significant reduction may be achieved in the viscosity of the polyethercarbonate polyol, accompanied by a retention of advantageous process economy. Fractions higher than 20 mol % may be disadvantageous, since the achievable reduction in viscosity through this additional fraction is no longer reflected in an appropriate reduction in viscosity. Accordingly, the molecular weight is increased without achievement of a significant reduction in viscosity.

In one preferred variant embodiment of the polyethercarbonate polyol, the lightest and the heaviest alkylene oxides may have a nonuniform distribution within the polyethercarbonate polyol, By means of the process of the invention it is possible on the one hand to prepare homogeneous, symmetrical terpolymers which are formed, for example, from a middle structural unit, formed from a difunctional starter molecule, and two structural units linking to it and consisting of terpolymers (see scheme (XI)):

Terpolymer-Starter-Terpolymer (XI)

For the preparation of this kind of terpolymer, the composition of the monomer mixture is kept constant during the polymerization stage. On the other hand, the process of the invention can also be used in principle to produce block terpolymers, consisting for example of a middle structural unit, formed from a difunctional starter molecule, and terpolymer units linking to it and each having different constructions (see scheme (XII)).

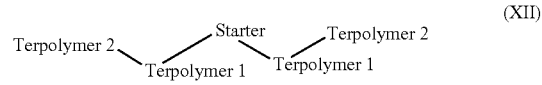 (XII)

For the preparation of the block terpolymers, for example, the composition of the monomer mixture can be varied during the polymerization stage. In this way it is possible, for example, to obtain sections only with bulky side chains, and sections entirely without side chains. Also conceivable are gradient polymers in which the incorporation of the different monomer species changes continuously over the course of the chain. In addition, of course, the change in the monomer concentration in the course of operation may be more frequent, allowing in principle the synthesis of a polymer having an arbitrary number of different blocks. This flexibility in the process and in the polyethercarbonate polyols of the invention can lead to a much greater facility in fine-tuning of the polymer and hence of the polymer properties to its intended technical service properties.

Furthermore, in accordance with the embodiments and configurations presented, polyethercarbonate polyols may be used as a crosslinkable component within a crosslinking reaction for producing thermoset or elastomeric networks. Suitable crosslinking reactions include, for example, the radical crosslinking of unsaturated double bonds, which may be present in the polyethercarbonate polyols of the invention, with polythiols. Another possible crosslinking reaction is the crosslinking by photochemical 2+2 addition of unsaturated double bonds which may be present in the polyethercarbonate polyols of the invention.

The polyethercarbonate polyols of the invention with side chains may be used, furthermore, as starters for further polymerization steps, such as a subsequent reaction with alkylene oxides or with alkylene oxides and carbon dioxide, for example.

In the subsequent reaction of the terminal OH groups with difunctional chain extenders, such as diisocyanates for example, the polyethercarbonate polyols of the invention with side chains form linear chains. In the subsequent reaction with crosslinking reagents of relatively high functionality, such as isocyanates, for example, the low-viscosity polyethercarbonate polyols of the invention with side chains form networks which have elastomeric or thermoset character according to whether the service temperature is above or below the glass transition temperature. Following further reaction, the elastomers may be processed to moldings or sheetlike structures (coatings, films). In all of these embodiments, the use of polyethercarbonate polyols of low viscosity in comparison to the prior art results in a significant improvement in the technical manageability.

In one inventive embodiment of the above use, therefore, the polyethercarbonate polyol is reacted with di- and/or polyisocyanates. The low-viscosity polyethercarbonate polyols with side chains that are obtainable by the process of the invention can be processed without problems, in particular by reaction with di- and/or polyisocyanates, to form polyurethanes, more particularly to form flexible polyurethane foams, rigid polyurethane foams, polyurethane elastomers, or polyurethane coatings.

The low-viscosity polyethercarbonate polyols of the invention with side chains can also be used as internal plasticizers for PVC and rubbers, for example, especially for NBR and CR rubbers. The use of the polyethercarbonate polyols of the invention in the production of such materials comprising thermoset or elastomeric networks leads to an improvement in the physical material properties, such as reduced freezing temperature, increased shape alteration capacity, increased elastic properties, reduced hardness, possibly increased adhesion, and improved processing properties, for example. Without being tied to a theory, this is attributed to the effect of the side chains as internal plasticizers. For rubbers which include low-viscosity polyethercarbonate polyols as plasticizers, there are a multiplicity of possible applications in the industrial rubber sector, particularly as material for cable sheathing, hoses, seals, membranes, footwear soles, floor coverings, and damping equipment. As a result of the use of such internal plasticizers, the materials produced from the polyethercarbonate polyols remain permanently flexible and there is no outward diffusion of the plasticizer.

Accordingly, the polyethercarbonate polyol of the invention can be used in detergent and cleaning product formulations, as plasticizers, drilling fluids, fuel additives, ionic and nonionic surfactants, lubricants, process chemicals for papermaking or textiles production, cosmetic formulations, or as pore formers in the manufacture of ceramics. In all of these applications, the use of the polyethercarbonate polyols with side chains affords processing advantages in comparison to the prior-art polyethercarbonate polyol.

In a first embodiment, therefore, the invention relates to a process for preparing polyethercarbonate polyols having side chains, comprising the steps of:

($\alpha$) initially introducing a catalyst and
  ($\alpha\alpha$) a suspension medium which contains no H-functional groups
  and/or
  ($\alpha\beta$) a H-functional starter compound ($\beta$) metering in at least one epoxide, the difference in the molecular weight of the lightest and heaviest alkylene oxides metered in stages ($\beta$) and ($\gamma$) being greater than or equal to 24 g/mol and the lightest alkylene oxide being a C2-C4 alkylene oxide, it being possible for the epoxide(s) metered in step ($\gamma$) to be identical to or different from the epoxide or epoxides metered in step ($\beta$), and the step ($\beta$) being carried out between step ($\alpha$) and step ($\gamma$)

($\gamma$) metering in carbon dioxide and at least two alkylene oxides, it being possible for these alkylene oxides to be the same as or different from the alkylene oxide or oxides metered in step ($\beta$), characterized in that
the difference in the molecular weight of the lightest and heaviest alkylene oxides metered in stage ($\gamma$) is greater than or equal to 24 g/mol and the lightest alkylene oxide is a C2-C4 alkylene oxide, and, where no 1H-functional starter compound has been introduced in step ($\alpha$), step ($\gamma$) comprises the metered addition of a H-functional starter compound, and
the catalyst is a double metal cyanide catalyst.

In a second embodiment, the invention relates to a process according to the first embodiment, where carbon dioxide likewise is metered in step ($\beta$).

In a third embodiment, the invention relates to a process according to the first or second embodiment, the temperature in reaction step ($\gamma$) being below that of reaction step ($\beta$).

In a fourth embodiment, the invention relates to a process according to any of embodiments 1 to 3, the molar ratio of addition of the lightest to the heaviest alkylene oxide in steps ($\beta$) and ($\gamma$) in total being greater than or equal to 5:1 and less than or equal to 1000:1.

In a fifth embodiment, the invention relates to a process according to any of embodiments 1 to 4, at least one of the alkylene oxides metered in stages ($\beta$) and/or ($\gamma$) having a C2-C15 alkyl or alkenyl group.

In a sixth embodiment, the invention relates to a process according to any of embodiments 1 to 5, one or more of the alkylene oxides metered in step ($\gamma$) being selected from the group of the glycidyl ethers.

In a seventh embodiment, the invention relates to a process according to any of embodiments 1 to 6, the process being carried out continuously.

In an eighth embodiment, the invention relates to a process according to any of embodiments 1 to 7, a cyclic anhydride being added additionally in steps (β) and/or (γ).

In a ninth embodiment, the invention relates to a polyethercarbonate polyol obtainable by a process of any of embodiments 1 to 8, the viscosity of the polyethercarbonate polyol at 25° C. being less than or equal to 20 000 mPa·s and greater than or equal to 100 mPa·s.

In a tenth embodiment, the invention relates to a polyethercarbonate polyol of the ninth embodiment, the ratio of the carbonate ester groups to ether groups in the polymer being ≥1:20 and ≤1:1.

In an eleventh embodiment, the invention relates to a polyethercarbonate polyol of the ninth or tenth embodiment, the molecular weight $M_n$ being ≥400 and ≤10 000 000 g/mol.

In a twelfth embodiment, the invention relates to a polyethercarbonate polyol of any of embodiments nine to eleven, the fraction of the heaviest alkylene oxide incorporated into the polymer being ≥1 mol % and ≤20 mol %.

In a thirteenth embodiment, the invention relates to the use of the polyethercarbonate polyol of any of embodiments nine to twelve as a crosslinkable component within a cross-linking reaction for producing thermoset or elastomeric networks.

In a fourteenth embodiment, the invention relates to the use of the polyethercarbonate polyol of the thirteenth embodiment, the polyethercarbonate polyol being reacted with di- and/or polyisocyanates.

In a fifteenth embodiment, the invention relates to the use of the polyethercarbonate polyol of any of embodiments nine to twelve in detergent and cleaning product formulations, as plasticizers, drilling fluids, fuel additives, ionic and non-ionic surfactants, lubricants, process chemicals for papermaking or textiles production, cosmetic formulations, or as pore formers in the manufacture of ceramics.

EXAMPLES

Abbreviations and Substances
H-Functional Starter Compound (Starter) Used:
PET-1 difunctional poly(oxypropylene)polyol having an OH number of 112 $mg_{KOH}/g$
PET-2 symmetrically constructed trifunctional poly(oxypropylene) polyol having an OH number of 400 $mg_{KOH}/g$ with glycerol as central low-molecular-weight unit
Side Chain-Free Alkylene Oxides Used:
PO propylene oxide
Alkylene Oxides with Side Chains Used:
AGE allyl glycidyl ether
BPGE p-tert-butylphenyl glycidyl ether
EHGE 2-ethylhexyl glycidyl ether
GPE glycidyl phenyl ether
Side Chain-Free Comonomer Used:
MSA maleic anhydride The DMC catalyst was prepared according to example 6 of WO A 01/80994.
Methods
OH Number (Hydroxyl Number)

The OH number (hydroxyl number) was determined on the basis of DIN 53240-2, except using N-methylpyrrolidone rather than THF/dichloromethane as the solvent. Titration took place with 0.5 molar ethanolic KOH solution, with endpoint recognition by means of potentiometry. The test substance used was certified castor oil. The reporting of the unit in "mg KOH/g" refers to mg[KOH]/g[polyethercarbonate polyol].
Gel Permeation Chromatography The number-average $M_n$ and the weight-average $M_w$ molecular weights of the resulting polyethercarbonate polyols were determined by means of gel permeation chromatography (GPC). The procedure was that of DIN 55672-1: "Gel permeation chromatography, Part 1—Tetrahydrofuran as eluent" (SECurity GPC system from PSS Polymer Service, flow rate 1.0 ml/min; columns: 2×PSS SDV linear M, 8×300 mm, 5 μm; RID detector). Polystyrene samples of known molar mass were used for calibration. The polydispersity was calculated as the ratio $M_w/M_n$.
Rheology The viscosity of the product mixture was determined using a Physica MCR 501 rheometer from Anton Paar at 25° C., using a sphere/plate configuration with a sphere diameter of 25 mm and with a distance of 0.05 mm between sphere and plate. The shear rate was increased over 10 minutes from 0.01 to 1000 1/s. A value was taken every 10 seconds. The result reported is the viscosity as the average of the total of 60 measurement values.
$^1$H-NMR Spectroscopy The sample is dissolved in deuterated chloroform and measured on a Bruker spectrometer (AV400, 400 MHz).
Preparation of the Polyethercarbonate Polyols The polymerization reactions were conducted in a 300 ml Parr pressure reactor. The pressure reactor used in the examples had a height (internal) of 10.16 cm and an internal diameter of 6.35 cm. The reactor was equipped with an electrical heating jacket (maximum heating power 510 watts). The counter-cooling consisted of an immersed tube of external diameter 6 mm which had been bent into a U shape and which projected into the reactor up to 5 mm above the base, and through which cooling water flowed at about 10° C. The water flow was switched on and off by means of a magnetic valve. In addition, the reactor was equipped with an inlet tube and a thermal sensor of diameter 1.6 mm, which both projected into the reactor up to 3 mm above the base.

The heating power of the electrical heating jacket during the activation [first activation stage] averaged about 20% of the maximum heating power. As a result of the regulation, the heating power varied by ±5% of the maximum heating power. The occurrence of increased evolution of heat in the reactor, brought about by the rapid reaction of the propylene oxide during the activation of the catalyst [second activation stage], was observed via reduced heating power of the heating jacket, engagement of the counter-cooling, and, optionally, a temperature increase in the reactor. The occurrence of evolution of heat in the reactor, brought about by the continuous reaction of propylene oxide during the reaction [polymerization stage], led to a fall in the power of the heating jacket to about 8% of the maximum heating power. As a result of the regulation, the heating power varied by ±5% of the maximum heating power.

The hollow-shaft stirrer used in the examples was a hollow-shaft stirrer in which the gas was introduced into the reaction mixture via a hollow shaft in the stirrer. The stirrer body mounted on the hollow shaft had four arms and had a diameter of 35 mm and a height of 14 mm. At each end of the arm were mounted two gas outlets which had a diameter of 3 mm. The rotation of the stirrer gave rise to a reduced pressure such that the gas present above the reaction mixture ($CO_2$ and possibly alkylene oxide) was drawn off and introduced through the hollow shaft of the stirrer into the reaction mixture.

a) the construction of the polymer chain of the low-viscosity polyethercarbonate polyols by terpolymerization of alkylene oxides with defined weight differences and CO₂ produces not only the cyclic alkylene carbonate but also low-viscosity polyethercarbonate polyol having side chains, which contains on the one hand polycarbonate units shown in formula (XIIIa),

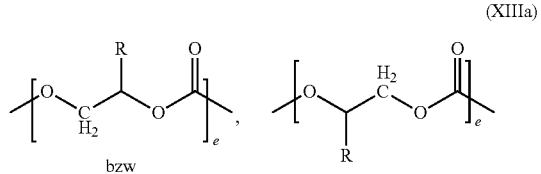

and contains on the other hand polyether units shown in formula (XIIIb).

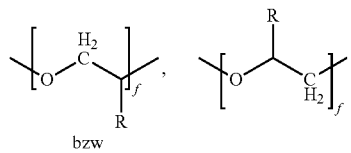

The ratio of the amount of cyclic propylene carbonate to polyethercarbonate polyol (selectivity; ratio g/e) and also the fraction of unreacted monomers (propylene oxide $R_{PO}$, allyl glycidyl ether $R_{AGE}$ in mol %, maleic anhydride $R_{MA}$ in mol %) were determined by means of ¹H-NMR spectroscopy. For this purpose, a sample of each reaction mixture obtained after the reaction was dissolved in deuterated chloroform and measured on a Bruker spectrometer (AV400, 400 MHz).

Subsequently, the reaction mixture was diluted with dichloromethane (20 ml) and the solution was passed through a falling-film evaporator. The solution (0.1 kg in 3 h) ran downwards along the inner wall of a tube of diameter 70 mm and length 200 mm which had been heated externally to 120° C., in the course of which the reaction mixture was distributed homogeneously as a thin film on the inner wall of the falling-film evaporator in each case by three rollers of diameter 10 mm rotating at a speed of 250 rpm. Within the tube, a pump was used to set a pressure of 3 mbar. The reaction mixture, which had been purified to free it of volatile constituents (unconverted alkylene oxide, cyclic carbonate, solvent) was collected in a receiver at the lower end of the heated tube.

The molar ratio of carbonate groups to ether groups in the low-viscosity polyethercarbonate polyols having side chains (ratio e1f) and also the molar fraction of maleic anhydride and allyl glycidyl ether incorporated into the polymer were determined by means of ¹H-NMR spectroscopy. For this purpose, a sample of each purified reaction mixture was dissolved in deuterated chloroform and measured on a Bruker spectrometer (AV400, 400 MHz).

The relevant resonances in the ¹H-NMR spectrum (based on TMS=0 ppm) which were used for integration are as follows:

| Signal | Shift in ppm | Designation | Area corresponds to number of H atoms |
|---|---|---|---|
| I1 | 1.10-1.17 | CH₃ group polyether units | 3 |
| I2 | 1.25-1.34 | CH₃ group polycarbonate units | 3 |
| I3 | 1.45-1.48 | CH₃group cyclic propylene carbonate | 3 |
| I4 | 2.95-3.00 | CH group free propylene oxide not consumed by the reaction | 1 |
| I5 | 5.83-5.94 | CH group (double bond from the incorporation of allyl glycidyl ether) | 1 |
| I6 | 6.22-6.29 | CH group (double bond from the incorporation of maleic anhydride) | 2 |
| I7 | 6.86-6.96 | CH group (aromatic ring from the incorporation of glycidyl phenyl ether) | 3 |
| I8 | 0.86-0.92 | CH₃-groups (from the incorporation of 2-ethylhexyl glycidyl ether) | 6 |
| I9 | 6.81-6.87 | CH groups (aromatic ring from the incorporation of p-tert-butylphenyl glycidyl ether) | 2 |
| I10 | 4.49-4.59 | CH group cyclic propylene carbonate | I10 |
| I11 | 4.80-5.10 | CH group polycarbonate units and one CH group of the cyclic propylene carbonate | I11 |

The figure reported is the molar ratio of the amount of cyclic propylene carbonate to carbonate units in the polyether carbonate polyol (selectivity g/e) and the molar ratio of carbonate groups to ether groups in the polyether carbonate polyol (e/f), and also the fractions of the unreacted propylene oxide (in mol %) and maleic anhydride (in mol %).

Taking account of the relative intensities, the values were calculated as follows:

Molar ratio of the amount of cyclic propylene carbonate to carbonate units in the polyether carbonate polyol (selectivity g/e):

$$g/e = I3/I2$$

Molar ratio of carbonate groups to ether groups in the polyethercarbonate polyol (e/f):

$$e/f = I2/I1$$

The fraction of carbonate units in the repeating units of the polyethercarbonate polyol obtained from the copolymerization of propylene oxide and CO₂:

$$C_{carbonate} = [(I2/3)/((I1/3)+(I2/3))] \times 100\%$$

The fraction of carbonate units in the repeating units of the polyethercarbonate polyol obtained from the terpolymerization of propylene oxide, allyl glycidyl ether, and CO₂ (P1):

$$C_{carbonate}(P1) = [(I2/3)/((I1/3)+(I2/3)+(I5))] \times 100\%$$

The fraction of via the incorporation of allyl glycidyl ether in the repeating units of the polyethercarbonate polyol (P1):

$$C_{AGE}=[(I5)/((I1/3)+(I2/3)+(I5))]\times 100\%$$

The fraction of carbonate units in the repeating units of the polyetherestercarbonate polyol obtained from the terpolymerization of propylene oxide, maleic anhydride, and $CO_2$ (P2):

$$C_{carbonate}(P2)=[(I2/3)/((I1/3)+(I2/3)+(I6/2))]\times 100\%$$

The fraction of via the incorporation of maleic anhydride in the repeating units of the polyethercarbonate polyol (P2):

$$C_{MSA}=[(I6/2)/((I1/3)+(I2/3)+(I6/2))]\times 100\%$$

The fraction of carbonate units in the repeating units of the polyetherestercarbonate polyol obtained from the terpolymerization of propylene oxide, allyl glycidyl ether, maleic anhydride and $CO_2$ (P3):

$$C_{carbonate}(P3)=[(I2/3)/((I1/3)+(I2/3)+(I5)+(I6/2))]\times 100\%$$

The fraction of via the incorporation of allyl glycidyl ether in the repeating units of the polyetherestercarbonate polyol (P3):

$$C'_{AGE}=[(I5)/((I1/3)+(I2/3)+(I5)+(I6/2))]\times 100\%$$

The fraction of via the incorporation of maleic anhydride in the repeating units of the polyetherestercarbonate polyol (P3):

$$C'_{MSA}=[(I6/2)/((I1/3)+(I2/3)+(I5)+(I6/2))]\times 100\%$$

The fraction of carbonate units in the repeating units of the polyethercarbonate polyol obtained from the terpolymerization of propylene oxide, glycidyl phenyl ether, and $CO_2$ (P4):

$$C_{carbonate}(P4)=[(I11-I10)/((I11-I10)+((I1/3)+(I7/3)))]\times 100\%$$

The fraction of via the incorporation of glycidyl phenyl ether in the repeating units of the polyethercarbonate polyol (P4):

$$C_{GPE}=[(I7/3)/((I11-I10)+((I1/3)+(I7/3))]\times 100\%$$

The fraction of carbonate units in the repeating units of the polyethercarbonate polyol obtained from the terpolymerization of propylene oxide, 2-ethylhexyl glycidyl ether and $CO_2$ (P5):

$$C_{carbonate}(P5)=[(I11-I10)/((I11-I10)+((I1/3)+(I8/6))]\times 100\%$$

The fraction of via the incorporation of 2-ethylhexyl glycidyl ether in the repeating units of the polyethercarbonate polyol (P5):

$$C_{EHGE}=[(I8/3)/((I11-I10)+((I1/3)+(I8/6))]\times 100\%$$

The fraction of carbonate units in the repeating units of the polyethercarbonate polyol obtained from the terpolymerization of propylene oxide, p-tert-butylphenyl glycidyl ether and $CO_2$ (P6):

$$C_{carbonate}(P6)=[(I11-I10)/((I11-I10)+((I1/3)+(I9/2))]\times 100\%$$

The fraction of via the incorporation of p-tert-butylphenyl glycidyl ether in the repeating units of the polyethercarbonate polyol (P6):

$$C_{t\text{-}BPGE}=[(I9/2)/((I11-I10)+((I1/3)+(I9/2))]\times 100\%$$

The fraction of carbonate units in the repeating units of the polyethercarbonate polyol in comparative example 11:

$$C'_{carbonate}=[(I11-I10)/((I11-I10)+((I1/3))]\times 100\%$$

Inventive Example 1: Terpolymerization of a Mixture of Propylene Oxide, 4.3 Mol % Allyl Glycidyl Ether and $CO_2$

[First Activation Stage]

A 300 ml pressure reactor equipped with a gas introduction stirrer was charged with a mixture of DMC catalyst (16 mg) and PET-1 (20 g) and this initial charge was stirred at 130° C. for 30 minutes under a partial vacuum (50 mbar), with argon being passed through the reaction mixture.

[Second Activation Stage]

Following injection of 15 bar of $CO_2$, at which a slight drop in temperature was observed, and following re-establishment of a temperature of 130° C., 2.0 g of a monomer mixture (8.2 wt % of allyl glycidyl ether, corresponding to 4.3 mol % in solution in propylene oxide) were metered by means of an HPLC pump (1 ml/min). The reaction mixture was stirred (800 rpm) at 130° C. for 20 min. The addition of 2.0 g of the monomer mixture was repeated a second and third time.

[Polymerization Stage]

After cooling to 100° C. had taken place, a further 53.9 g of the monomer mixture (8.2 wt % of allyl glycidyl ether) were metered via an HPLC pump (1 ml/min), the $CO_2$ pressure being held constant at 15 bar. The reaction mixture was subsequently stirred at 100° C. for 2 hours more. The reaction was halted by cooling of the reactor with ice-water.

The resulting mixture was free from the propylene oxide and allyl glycidyl ether monomers used.

| | | |
|---|---|---|
| Selectivity | g/e | 0.05 |
| | e/f | 0.23 |
| $C_{carbonate}$ (P1) in % | | 19.3 |
| $C_{AGE}$ in % | | 2.6 |
| Molecular weight in g/mol | $M_n$ | 5428 |
| Polydispersity | | 1.2 |
| OH number in mg KOH/g | | 26.0 |

Inventive Example 2: Terpolymerization of a Mixture of Propylene Oxide, 8.3 Mol % Allyl Glycidyl Ether and $CO_2$

[First Activation Stage]

A 300 ml pressure reactor equipped with a gas introduction stirrer was charged with a mixture of DMC catalyst (16 mg) and PET-1 (20 g) and this initial charge was stirred at 130° C. for 30 minutes under a partial vacuum (50 mbar), with argon being passed through the reaction mixture.

[Second Activation Stage]

Following injection of 15 bar of $CO_2$, at which a slight drop in temperature was observed, and following re-establishment of a temperature of 130° C., 2.0 g of a monomer mixture (15.2 wt % of allyl glycidyl ether, corresponding to 8.3 mol % in solution in propylene oxide) were metered by means of an HPLC pump (1 ml/min). The reaction mixture was stirred (800 rpm) at 130° C. for 20 min. The addition of 2.0 g of the monomer mixture was repeated a second and third time.

[Polymerization Stage]

After cooling to 100° C. had taken place, a further 54.0 g of the monomer mixture (15.2 wt % of allyl glycidyl ether) were metered via an HPLC pump (1 ml/min), the $CO_2$ pressure being held constant at 15 bar. The reaction mixture was subsequently stirred at 100° C. for 2 hours more. The reaction was halted by cooling of the reactor with ice-water.

The resulting mixture was free from the propylene oxide and allyl glycidyl ether monomers used.

| Selectivity | g/e | | 0.06 |
|---|---|---|---|
| | e/f | | 0.25 |
| $C_{carbonate}$ (P1) in % | | | 20.3 |
| $C_{AGE}$ in % | | | 6.4 |
| Molecular weight in g/mol | $M_n$ | | 5446 |
| Polydispersity | | | 2.0 |
| OH number in mg KOH/g | | | 26.9 |

Inventive Example 3: Terpolymerization of a Mixture of Propylene Oxide, 16.4 Mol % Allyl Glycidyl Ether and $CO_2$

[First Activation Stage]

A 300 ml pressure reactor equipped with a gas introduction stirrer was charged with a mixture of DMC catalyst (16 mg) and PET-1 (20 g) and this initial charge was stirred at 130° C. for 30 minutes under a partial vacuum (50 mbar), with argon being passed through the reaction mixture.

[Second Activation Stage]

Following injection of 15 bar of $CO_2$, at which a slight drop in temperature was observed, and following re-establishment of a temperature of 130° C., 2.0 g of a monomer mixture (30.4 wt % of allyl glycidyl ether, corresponding to 16.4 mol % in solution in propylene oxide) were metered by means of an HPLC pump (1 ml/min). The reaction mixture was stirred (800 rpm) at 130° C. for 20 min. The addition of 2.0 g of the monomer mixture was repeated a second and third time.

[Polymerization Stage]

After cooling to 100° C. had taken place, a further 54.0 g of the monomer mixture (30.4 wt % of allyl glycidyl ether) were metered via an HPLC pump (1 ml/min), the $CO_2$ pressure being held constant at 15 bar. The reaction mixture was subsequently stirred at 100° C. for 2 hours more. The reaction was halted by cooling of the reactor with ice-water.

The resulting mixture was free from the propylene oxide and allyl glycidyl ether monomers used.

| Selectivity | g/e | | 0.09 |
|---|---|---|---|
| | e/f | | 0.28 |
| $C_{carbonate}$ (P1) in % | | | 22.2 |
| $C_{AGE}$ in % | | | 13.6 |
| Molecular weight in g/mol | $M_n$ | | 5432 |
| Polydispersity | | | 1.8 |
| OH number in mg KOH/g | | | 28.6 |

Example 4 (Comparative): Copolymerization of Propylene Oxide and $CO_2$ without Addition of a Heavier, Side Chain-Bearing Alkylene Oxide

[First Activation Stage]

A 300 ml pressure reactor equipped with a gas introduction stirrer was charged with a mixture of DMC catalyst (16 mg) and PET-1 (20 g) and this initial charge was stirred at 130° C. for 30 minutes under a partial vacuum (50 mbar), with argon being passed through the reaction mixture.

[Second Activation Stage]

After injection of $CO_2$ to 15 bar, in the course of which a slight drop in temperature was observed, and re-attainment of a temperature of 130° C., 2.0 g of propylene oxide were metered in with the aid of an HPLC pump (1 ml/min). The reaction mixture was stirred (800 rpm) at 130° C. for 20 min. The addition of 2.0 g of propylene oxide was repeated a second and third time.

[Polymerization Stage]

After cooling to 100° C., a further 54.0 g of propylene oxide were metered in using an HPLC pump (1 ml/min), in the course of which the $CO_2$ pressure was kept constant at 15 bar. The reaction mixture was subsequently stirred at 100° C. for 2 hours more. The reaction was halted by cooling of the reactor with ice-water.

The resulting mixture was free of propylene oxide.

| Selectivity | g/e | | 0.09 |
|---|---|---|---|
| | e/f | | 0.26 |
| $C_{carbonate}$ in % | | | 20.7 |
| Molecular weight in g/mol | $M_n$ | | 5495 |
| Polydispersity | | | 1.4 |
| OH number in mg KOH/g | | | 26.2 |

Example 5 (Comparative): Copolymerization of Propylene Oxide and $CO_2$ without Addition of a Heavier, Side Chain-Bearing Alkylene Oxide, Using a Trifunctional Starter, for Preparing a Polyethercarbonate Polyol Having Three Side Chains of Equal Length

[First Activation Stage]

A 300 ml pressure reactor equipped with a gas introduction stirrer was charged with a mixture of DMC catalyst (33 mg) and PET-2 (16.8 g) and this initial charge was stirred at 130° C. for 30 minutes under a partial vacuum (50 mbar), with argon being passed through the reaction mixture.

[Second Activation Stage]

After injection of $CO_2$ to 15 bar, in the course of which a slight drop in temperature was observed, and re-attainment of a temperature of 130° C., 1.7 g of propylene oxide were metered in with the aid of an HPLC pump (1 ml/min). The reaction mixture was stirred (800 rpm) at 130° C. for 20 min. The addition of 1.7 g of propylene oxide was repeated a second and third time.

[Polymerization Stage]

After cooling to 100° C., a further 138.0 g of propylene oxide were metered in using an HPLC pump (1 ml/min), in the course of which the $CO_2$ pressure was kept constant at 15 bar. The reaction mixture was subsequently stirred at 100° C. for 2 hours more. The reaction was halted by cooling of the reactor with ice-water.

The resulting mixture was free of propylene oxide.

| Selectivity | g/e | | 0.11 |
|---|---|---|---|
| | e/f | | 0.24 |
| $C_{carbonate}$ in % | | | 19.1 |
| Molecular weight in g/mol | $M_n$ | | 5964 |
| Polydispersity | | | 1.3 |
| OH number in mg KOH/g | | | 35.7 |

TABLE 1

Comparison of the results from examples 1 to 4

| No. | F | Amount in mol % AGE | Selectivity g/e | e/f | $M_n$ g/mol | Polydispersity | OH number $mg_{KOH}/g$ | Viscosity mPa · s |
|---|---|---|---|---|---|---|---|---|
| 1 | 2 | 2.6 | 0.08 | 0.23 | 5428 | 1.2 | 26.0 | 4600 |
| 2 | 2 | 6.4 | 0.06 | 0.25 | 5446 | 2.0 | 26.9 | 4000 |
| 3 | 2 | 13.6 | 0.09 | 0.28 | 5432 | 1.8 | 28.6 | 4800 |
| 4 (comp.) | 2 | n.e. | 0.09 | 0.26 | 5495 | 1.4 | 26.2 | 7900 |
| 5 (comp.) | 3 | n.e. | 0.11 | 0.24 | 5964 | 1.3 | 35.7 | 9693 |

(comp.): Comparative example;
n.e.: absent

A comparison of inventive examples 1 to 3 with comparative example 4 shows that the incorporation of side chains into linear polyethercarbonate chains (functionality F=2) leads to a reduction in the viscosity of the products obtained. As the fraction of side chains goes up (inventive example 1 relative to inventive example 2), there is initially a decrease in viscosity, which rises again as the fraction of side chains increases further (inventive example 2 relative to inventive example 3). A comparison of the inventive examples 1 to 3 with comparative example 5 shows that symmetrically constructed polyethercarbonate polyols having three polyethercarbonate side chains of equal length (functionality F=3, average molecular weight of 5964/3=1988 g/mol per side chain), originating from a central low-molecular-weight unit, exhibit a significantly higher viscosity.

Inventive Example 6: Block Terpolymer, by Terpolymerization with Propylene Oxide, 16.6 Mol % Maleic Anhydride and $CO_2$, Followed by a Terpolymerization with Propylene Oxide, 16.4 Mol % Allyl Glycidyl Ether and $CO_2$

[First Activation Stage]
A 300 ml pressure reactor equipped with a gas introduction stirrer was charged with a mixture of DMC catalyst (16 mg) and PET-1 (20 g) and this initial charge was stirred at 130° C. for 30 minutes under a partial vacuum (50 mbar), with argon being passed through the reaction mixture.
[Second Activation Stage]
Following injection of 15 bar of $CO_2$, at which a slight drop in temperature was observed, and following re-establishment of a temperature of 130° C., 2.0 g of a first monomer mixture (26.2 wt % of maleic anhydride, corresponding to 16.6 mol % in solution in propylene oxide) were metered by means of an HPLC pump (1 ml/min). The reaction mixture was stirred (800 rpm) at 130° C. for 20 1.0 min. The addition of 2.0 g of the first monomer mixture was repeated a second and third time.
[Polymerization Stage]
After cooling to 100° C. had taken place, a further 23.8 g of the first monomer mixture (26.2 wt % of maleic anhydride in solution in propylene oxide) were metered via an HPLC pump (1 ml/min), the $CO_2$ pressure being held constant at 15 bar. Following the addition of the first monomer mixture (26.2 wt % of maleic anhydride in solution in propylene oxide), 30 g of a second monomer mixture (30.4 wt % of allyl glycidyl ether, corresponding to 16.4 mol % in solution in propylene oxide) were metered in via an HPLC pump (1 ml/min), with the $CO_2$ pressure being held constant at 15 bar.

The reaction mixture was subsequently stirred at 100° C. for 2 hours more. The reaction was halted by cooling of the reactor with ice-water.

The resulting mixture was free from the monomers used: propylene oxide ($R_{PO}$=0%), allyl glycidyl ether ($R_{AGE}$=0%), and maleic anhydride ($R_{MA}$=0%).

| | | |
|---|---|---|
| Selectivity | g/e | 0.04 |
| | e/f | 0.56 |
| $C_{carbonate}$ (P3) in % | | 36.3 |
| $C'_{AGE}$ in % | | 6.9 |
| $C'_{MSA}$ in % | | 7.2 |
| Molecular weight in g/mol | $M_n$ | 4340 |
| Polydispersity | | 3.4 |
| OH number in mg KOH/g | | 24.3 |

Example 7 (Comparative): Terpolymerization of Propylene Oxide, 16.6 Mol % Maleic Anhydride and $CO_2$

[First Activation Stage]
A 300 ml pressure reactor equipped with a gas introduction stirrer was charged with a mixture of DMC catalyst (16 mg) and PET-1 (20 g) and this initial charge was stirred at 130° C. for 30 minutes under a partial vacuum (50 mbar), with argon being passed through the reaction mixture.
[Second Activation Stage]
Following injection of 15 bar of C02, at which a slight drop in temperature was observed, and following re-establishment of a temperature of 130° C., 2.0 g of a monomer mixture (26.2 wt % of maleic anhydride, corresponding to 16.6 mol % in solution in propylene oxide) were metered by means of an HPLC pump (1 ml/min). The reaction mixture was stirred (800 rpm) at 130° C. for 20 min. The addition of 2.0 g of the monomer mixture was repeated a second and third time.
[Polymerization Stage]
After cooling to 100° C. had taken place, a further 54.0 g of the monomer mixture (26.2 wt % of maleic anhydride in solution in propylene oxide) were metered via an HPLC pump (1 ml/min), the $CO_2$ pressure being held constant at 15 bar. The reaction mixture was subsequently stirred at 100° C. for 2 hours more. The reaction was halted by cooling of the reactor with ice-water.

The resulting mixture was free of the propylene oxide and maleic anhydride monomers used.

| | | |
|---|---|---|
| Selectivity | g/e | 0.02 |
| | e/f | 0.52 |
| $C_{carbonate}$ (P2) in % | | 29.8 |
| $C_{MA}$ in % | | 12.8 |
| Molecular weight in g/mol | $M_n$ | 4955 |
| Polydispersity | | 2.1 |
| OH number in mg KOH/g | | 25.0 |

| | | |
|---|---|---|
| Selectivity | g/e | 0.08 |
| | e/f | 0.25 |
| $C_{carbonate}$ (P4) in % | | 18.7 |
| $C_{GPE}$ in % | | 5.2 |
| Molecular weight in g/mol | $M_n$ | 4912 |
| Polydispersity | | 1.5 |
| OH number in mg KOH/g | | 25.1 |

TABLE 2

Comparison of the results from inventive examples 6 and 7

| No. | Amount in mol % | | Selectivity | | $M_n$ | Polydispersity | OH number | Viscosity |
| | AGE | MA | g/e | e/f | g/mol | | $mg_{KOH}$/g | mPa · s |
|---|---|---|---|---|---|---|---|---|
| 6 | 6.9 | 7.2 | 0.04 | 0.56 | 4340 | 3.4 | 24.3 | 17 000 |
| 7 (comp.) | n.e. | 12.8 | 0.02 | 0.52 | 4955 | 2.1 | 25.0 | 29 200 |

(comp.): Comparative example;
n.e.: absent

The products from inventive example 6 and comparative example 7 contain an identical number of double bonds and have the same average molecular weight (same OH number). A comparison of inventive example 6 featuring side chain-bearing monomers with comparative example 7 without side chain-bearing monomers shows that the incorporation of heavier, side chain-bearing monomers leads to a reduction in the viscosity of the resulting products.

Inventive Example 8: Terpolymerization of Propylene Oxide, 6.7 Mol % Glycidyl Phenyl Ether and $CO_2$

[First Activation Stage]

A 300 ml pressure reactor equipped with a gas introduction stirrer was charged with a mixture of DMC catalyst (16 mg) and PET-1 (20 g) and this initial charge was stirred at 130° C. for 30 minutes under a partial vacuum (50 mbar), with argon being passed through the reaction mixture.

[Second Activation Stage]

Following injection of 15 bar of $CO_2$, during which a slight drop in temperature was observed, and re-establishment of a temperature of 130° C., 2.0 g of a monomer mixture (15.5 wt % of glycidyl phenyl ether, corresponding to 6.7 mol % in solution in propylene oxide) were metered in by means of an HPLC pump (1 ml/min). The reaction mixture was stirred (800 rpm) at 130° C. for 20 min. The addition of 2.0 g of the monomer mixture was repeated a second and third time.

[Polymerization Stage]

After cooling to 100° C. had taken place, a further 60.3 g of the monomer mixture (15.5 wt % of glycidyl phenyl ether in solution in propylene oxide) were metered in via an HPLC pump (1 ml/min), with the $CO_2$ pressure being kept constant at 15 bar. The reaction mixture was subsequently stirred at 100° C. for 2 hours more. The reaction was halted by cooling of the reactor with ice-water.

The resulting mixture was free from the propylene oxide and glycidyl phenyl ether monomers used.

Inventive Example 9: Terpolymerization of Propylene Oxide, 6.7 mol % 2-Ethylhexyl Glycidyl Ether and $CO_2$

[First Activation Stage]

A 300 ml pressure reactor equipped with a gas introduction stirrer was charged with a mixture of DMC catalyst (16 mg) and PET-1 (20 g) and this initial charge was stirred at 130° C. for 30 minutes under a partial vacuum (50 mbar), with argon being passed through the reaction mixture.

[Second Activation Stage]

Following injection of 15 bar of $CO_2$, during which a slight drop in temperature was observed, and re-establishment of a temperature of 130° C., 2.0 g of a monomer mixture (18.6 wt % of 2-ethylhexyl glycidyl ether, corresponding to 6.7 mol % in solution in propylene oxide) were metered in by means of an HPLC pump (1 ml/min). The reaction mixture was stirred (800 rpm) at 130° C. for 20 min. The addition of 2.0 g of a monomer mixture was repeated a second and third time.

[Polymerization Stage]

After cooling to 100° C. had taken place, a further 62.8 g of the monomer mixture (18.6 wt % of 2-ethylhexyl glycidyl ether in solution in propylene oxide) were metered in via an HPLC pump (1 ml/min), with the $CO_2$ pressure being kept constant at 15 bar. The reaction mixture was subsequently stirred at 100° C. for 2 hours more. The reaction was halted by cooling of the reactor with ice-water.

The resulting mixture was free from the propylene oxide and 2-ethylhexyl glycidyl ether monomers used.

| | | |
|---|---|---|
| Selectivity | g/e | 0.07 |
| | e/f | 0.26 |
| $C_{carbonate}$ (P5) in % | | 19.3 |
| $C_{EHGE}$ in % | | 5.4 |
| Molecular weight in g/mol | $M_n$ | 5320 |
| Polydispersity | | 2.7 |
| OH number in mg KOH/g | | 23.5 |

Inventive Example 10: Terpolymerization of Propylene Oxide, 6.7 mol % p-Tert-Butylphenyl Glycidyl Ether and CO$_2$

[First Activation Stage]

A 300 ml pressure reactor equipped with a gas introduction stirrer was charged with a mixture of DMC catalyst (16 mg) and PET-1 (20 g) and this initial charge was stirred at 130° C. for 30 minutes under a partial vacuum (50 mbar), with argon being passed through the reaction mixture.

[Second Activation Stage]

Following injection of 15 bar of CO$_2$, during which a slight drop in temperature was observed, and re-establishment of a temperature of 130° C., 2.0 g of a monomer mixture (20.2 wt % of p-tert-butylphenyl glycidyl ether, corresponding to 6.7 mol % in solution in propylene oxide) were metered in by means of an HPLC pump (1 ml/min). The reaction mixture was stirred (800 rpm) at 130° C. for 20 min. The addition of 2.0 g of the monomer mixture was repeated a second and third time.

[Polymerization Stage]

After cooling to 100° C. had taken place, a further 64.2 g of the monomer mixture (20.2 wt % of p-tert-butylphenyl glycidyl ether in solution in propylene oxide) were metered in via an HPLC pump (1 ml/min), with the CO$_2$ pressure being kept constant at 15 bar. The reaction mixture was subsequently stirred at 100° C. for 2 hours more. The reaction was halted by cooling of the reactor with ice-water.

The resulting mixture was free from the propylene oxide and p-tert-butylphenyl glycidyl ether monomers used.

| Selectivity | g/e | 0.08 |
|---|---|---|
| | e/f | 0.23 |
| $C_{carbonate}$ (P6) in % | | 18.1 |
| $C_{BPGE}$ in % | | 4.5 |
| Molecular weight in g/mol | $M_n$ | 4999 |
| Polydispersity | | 1.5 |
| OH number in mg KOH/g | | 24.0 |

Example 11 (Comparative): Reaction of Propylene Oxide and CO$_2$ without Comonomer Addition

[First Activation Stage]

A 300 ml pressure reactor equipped with a gas introduction stirrer was charged with a mixture of DMC catalyst (16 mg) and PET-1 (20 g) and this initial charge was stirred at 130° C. for 30 minutes under a partial vacuum (50 mbar), with argon being passed through the reaction mixture.

[Second Activation Stage]

After injection of CO$_2$ to 15 bar, in the course of which a slight drop in temperature was observed, and re-attainment of a temperature of 130° C., 2.0 g of propylene oxide were metered in with the aid of an HPLC pump (1 ml/min). The reaction mixture was stirred (800 rpm) at 130° C. for 20 min. The addition of 2.0 g of propylene oxide was repeated a second and third time.

[Polymerization Stage]

After cooling to 100° C., a further 64.0 g of propylene oxide were metered in using an HPLC pump (1 ml/min), in the course of which the CO$_2$ pressure was kept constant at 15 bar. The reaction mixture was subsequently stirred at 100° C. for 2 hours more. The reaction was halted by cooling of the reactor with ice-water.

The resulting mixture was free of propylene oxide.

| Selectivity | g/e | 0.08 |
|---|---|---|
| | e/f | 0.25 |
| $C_{carbonate}$ in % | | 20.0 |
| Molecular weight in g/mol | $M_n$ | 5427 |
| Polydispersity | | 1.3 |
| OH number in mg KOH/g | | 24.5 |

TABLE 3

Comparison of the results from examples 8 to 11

| No. | | Comonomer Content mol % | Selectivity g/e | e/f | $M_n$ g/mol | Polydispersity | OH number mg KOH/g | Viscosity mPa·s |
|---|---|---|---|---|---|---|---|---|
| 8 | GPE | 5.2 | 0.08 | 0.25 | 4912 | 1.5 | 25.1 | 10 210 |
| 9 | EHGE | 5.4 | 0.07 | 0.26 | 5320 | 2.7 | 23.5 | 11 320 |
| 10 | BPGE | 4.5 | 0.08 | 0.23 | 4999 | 1.5 | 24.0 | 10 760 |
| 11 (comp.) | n.e. | n.e. | 0.08 | 0.25 | 5427 | 1.3 | 24.5 | 14 870 |

(comp.): Comparative example;
n.e.: absent

Comparison of inventive examples 8 to 10 with comparative example 10 shows the introduction of different side chains into the polymer chain to lead to a reduction in the viscosity of each of the resulting products.

The invention claimed is:

1. A process for preparing polyethercarbonate polyols having side chains, comprising the steps of:
   (α) initially introducing a catalyst and (αα) a suspension medium which contains no H-functional groups and/or (αβ) a H-functional starter compound;
   (β) metering in at least one alkylene oxide; and
   (γ) metering in carbon dioxide and at least two alkylene oxides, wherein one or more of the alkylene oxides metered in step (γ) is a glycidyl ether, wherein the at least one alkylene oxide metered in step (β) is different than at least one of the at least two alkylene oxides metered in step (γ), and wherein at least one of the at least two alkylene oxides metered in step (γ) is different than another one of the at least two alkylene oxides metered in step (γ);
   wherein the difference in the molecular weight of a lightest and a heaviest alkylene oxide metered in steps (β) and (γ) is greater than or equal to 24 g/mol, and the lightest alkylene oxide metered in steps (β) and (γ) is a C2-C4 alkylene oxide, wherein the C2-C4 alkylene oxide is ethylene oxide and/or propylene oxide, and the step (β) is carried out between step (α) and step (γ);

wherein the difference in the molecular weight of a lightest and heaviest alkylene oxides metered in step (γ) is greater than or equal to 24 g/mol, and the lightest alkylene oxide metered in step (γ) is a C2-C4 alkylene oxide, and when no H-functional starter compound is initially introduced in step (α), step (γ) further comprises metering in a H-functional starter compound;

wherein the molar ratio of a lightest to a heaviest alkylene oxide added in steps (β) and (γ) in total is greater than or equal to 5:1 and less than or equal to 1000:1; and wherein the catalyst is a double metal cyanide catalyst, and wherein the glycidyl ether metered in step (γ) and is selected from the group consisting of allyl glycidyl ether, p-tert-butylphenyl glycidyl ether, 2-ethylhexyl glycidyl ether, glycidyl phenyl ether, methyl glycidyl ether, ethyl glycidyl ether, 2-ethyl hexyl glycidyl ether, allyl glycidyl ether, glycidyl methacrylate, 3-glycidyloxypropyltrimethoxysilane, 3-glycidyloxypropyltriethoxysilane, 3-glycidyloxypropyltripropoxysilane, 3-glycidyloxypropylmethyldimethoxysilane, 3-glycidyloxypropylethyldiethoxysilane, 3-glycidyloxypropyltriisopropoxysilane, and combinations of any thereof.

2. The process of claim 1, wherein carbon dioxide is metered in step (β).

3. The process of claim 1, wherein the temperature in reaction step (γ) is below the temperature of reaction step (β).

4. The process of claim 1, wherein at least one of the alkylene oxides metered in stages (β) and/or (γ) comprises a C2-C15 alkyl or alkenyl group.

5. The process of claim 1, wherein the process is carried out continuously.

6. The process of claim 1, wherein a cyclic anhydride is added in steps (β) and/or (γ).

7. A polyethercarbonate polyol obtained by the process of claim 1, wherein the viscosity of the polyethercarbonate polyol at 25° C. is less than or equal to 20,000 mPas and greater than or equal to 100 mPas, and wherein the fraction of the heaviest alkylene oxide incorporated into the polymer is ≥1 mol % and ≤20 mol %.

8. The polyethercarbonate polyol of claim 7, wherein the ratio of the carbonate ester groups to ether groups of the polymer is ≥1:20 and ≤1:1.

9. The polyethercarbonate polyol of claim 7, wherein the molecular weight Mn is ≥400 and ≤10,000,000 g/mol.

10. A method comprising utilizing the polyethercarbonate polyol of claim 7 as a crosslinkable component within a crosslinking reaction for producing thermoset or elastomeric networks.

11. The method of claim 10, comprising reacting the polyethercarbonate polyol with di- and/or polyisocyanates.

12. An article comprising the polyethercarbonate polyol of claim 7, wherein the article is selected from the group consisting of detergent or cleaning product formulation, plasticizer, drilling fluid, fuel additive, ionic and non-ionic surfactant, lubricant, process chemical for papermaking or textiles production, cosmetic formulation, and pore formers in the manufacture of ceramics.

* * * * *